US011798409B2

(12) United States Patent
Leginusz

(10) Patent No.: US 11,798,409 B2
(45) Date of Patent: Oct. 24, 2023

(54) DYNAMIC ROUTE GENERATION FOR LICENSE-BASED PARKING ENFORCEMENT

(71) Applicant: Asura Technologies Ltd., Budapest (HU)

(72) Inventor: László Leginusz, Budapest (HU)

(73) Assignee: Asura Technologies Ltd.

( * ) Notice: Subject to any disclaimer, the term of this patent is extended or adjusted under 35 U.S.C. 154(b) by 170 days.

(21) Appl. No.: 17/460,633

(22) Filed: Aug. 30, 2021

(65) Prior Publication Data

US 2023/0069020 A1    Mar. 2, 2023

(51) Int. Cl.

| | |
|---|---|
| *G08G 1/017* | (2006.01) |
| *G06T 7/292* | (2017.01) |
| *G06F 3/04817* | (2022.01) |
| *G06V 20/62* | (2022.01) |
| *G06V 20/10* | (2022.01) |
| *G08G 1/056* | (2006.01) |
| *H04N 7/18* | (2006.01) |

(52) U.S. Cl.
CPC ....... *G08G 1/0175* (2013.01); *G06F 3/04817* (2013.01); *G06T 7/292* (2017.01); *G06V 20/10* (2022.01); *G08G 1/056* (2013.01); *H04N 7/183* (2013.01); *G06V 20/625* (2022.01); *G06V 2201/08* (2022.01)

(58) Field of Classification Search
CPC ...... G08G 1/0175; G08G 1/056; G06T 7/292; G06V 20/10; G06V 20/625; G06V 2201/08; G06F 3/04817; H04N 7/183
USPC ............................................ 348/149; 705/13
See application file for complete search history.

(56) References Cited

U.S. PATENT DOCUMENTS

| | | | | |
|---|---|---|---|---|
| 11,574,507 B2* | 2/2023 | Moran | ................... | H04W 4/029 |
| 11,610,487 B2* | 3/2023 | Sandbrook | ............. | G08G 1/143 |
| 11,651,298 B2* | 5/2023 | Andersson | ......... | G06Q 20/3224 |
| | | | | 705/5 |

(Continued)

FOREIGN PATENT DOCUMENTS

| | | | |
|---|---|---|---|
| EP | 2 925 564 B1 | 10/2015 | |
| EP | 2925564 B1 * | 8/2019 | ............... G06K 9/00 |

OTHER PUBLICATIONS

International Search Report and Written Opinion on PCT PCT/IB2022/000599 dated Feb. 3, 2023.

*Primary Examiner* — Brian P Yenke
*Assistant Examiner* — Omer Khalid
(74) *Attorney, Agent, or Firm* — Foley & Lardner LLP

(57) ABSTRACT

Systems, methods, and apparatuses for real-time vehicular parking enforcement are provided. The system can include a data processing system ("DPS") comprising one or more processors and memory. The DPS can receive data captured by one or more cameras. The DPS can detect entry of a vehicle into the facility. The DPS can determine an identification number for the vehicle. The DPS can track the vehicle to a parking spot. The DPS can generate a parking event for the vehicle. The DPS can establish a timer for querying a transaction processing system. The DPS can query the transaction processing system for transaction information associated with the identification number. The DPS can generate a violation event for the vehicle. The DPS can classify the violation event. The DPS can overlay, on a digital map of the facility, an icon on the parking spot that indicates the classification of the violation event.

18 Claims, 5 Drawing Sheets

(56) References Cited

U.S. PATENT DOCUMENTS

| | | | | |
|---|---|---|---|---|
| 11,663,916 B2* | 5/2023 | Gruteser | ................... | G08G 1/01 |
| | | | | 340/932.2 |
| 2011/0099126 A1* | 4/2011 | Belani | ..................... | G08G 1/14 |
| | | | | 705/418 |
| 2013/0211699 A1* | 8/2013 | Scharmann | ............ | G08G 1/146 |
| | | | | 701/117 |
| 2018/0225650 A1* | 8/2018 | Vossoughi | ......... | G06Q 20/3276 |
| 2019/0122447 A1* | 4/2019 | Shah | ................. | G06Q 20/0855 |

\* cited by examiner

DYNAMIC ROUTE GENERATION FOR LICENSE-BASED PARKING ENFORCEMENT

BACKGROUND

Automotive vehicles can be parked in parking lots or facilities. The driver or other user of the vehicle can purchase a parking ticket in order to park at the parking lot. Administrators of the parking lots can monitor the parking lot to determine whether a vehicle has parked in the parking lot without a parking ticket, or whether a parking ticket has expired. However, due to the number of vehicles in a parking lot, or the various parking statuses associated with the vehicles, it can be challenging to efficiently and effectively monitor the vehicles.

SUMMARY

This technical solution is directed to systems, methods, and apparatus for real-time vehicular parking enforcement. In a parking facility, it can be challenging to enforce parking due to various technical challenges associated with parking infrastructure and information technology. For example, it can be technically challenging to detect whether vehicles have entered or exited a parking facility without a barrier or gate; track vehicles within a parking facility; or identify vehicles violating one or more policies. These technical challenges can give rise to or result in excessive erroneous alarms or unreliability trigger alarm conditions, that can cause wasted or unnecessary remedial actions to be performed by parking facility infrastructure or personnel. For example, a particular vehicle can be flagged has having violated a parking condition, which can trigger an enforcement officer to place a ticket on the vehicle erroneously. Further, the information technology infrastructure of the parking facility can apply digital blocks or digital holds on the vehicle responsive to the erroneous alarm, thereby resulting in wasted remote procedure calls, memory utilization, or processor utilization. In some cases, enforcement officers may patrol within or around the vicinity of the parking facility more frequently or for an extended duration to identify any misconduct or violations. However, having enforcement officers patrol individual parking facilities to manually confirm whether each vehicle is in violation can be time-consuming, inefficient, and prone to errors. Additionally, the facility may include a gated access point to minimize at least a portion of the violations. However, with the gated access point, the ingress and egress time can be negatively affecting due to the bottleneck and obstruction of the traffic flow into or out of the facility. Hence, the consequences of having a gated access point can include at least one of access delay, reduction of vehicle throughput, or queue overflow.

Systems, methods, and apparatus of this technical solution provide real-time vehicular parking enforcement monitor for transmitting information of parking slot occupancy within various parking facilities. The system can provide real-time information to enforcement devices used by parking enforcement officers. For example, the system can provide a user interface to the enforcement devices to display indications of any vehicle that has not paid for parking, parked at a restricted slot, among other violations or status of parking facilities. The system can include one or more cameras to capture various images or record videos within or around the vicinity of the parking facility. The system can register vehicles accessing the facility based on the identification number of the respective vehicles. The system can track parking space occupancy including allocated empty and occupied slots within the facilities. The system can capture the identification numbers of vehicles and track parking space occupancy using cameras and video analytics. The system can capture other activities or events of the vehicles, such as logging the locations of parked vehicles.

The system can be used to enforce a pay-by-plate policy for vehicles parking in the facility, which can include referencing the identification number of the vehicle for any parking violation. To verify the status of payment from clients of the respective vehicles, the system can query various transaction processing systems associated with the parking facility to obtain transaction details linked to the identification number of each registered vehicle. The system can map one or more graphical content to parked vehicles, such as an icon indicating an event of parking violation, on an application having a user interface displaying various parking events. This application can be accessed via an enforcement device. In some cases, the system can provide graphical content associated with one or more parked vehicles on various monitored sites managed by the operator of the parking facility.

The system can generate an optimal route based on the parking events within one or more facilities. The system can provide the optimal route to an enforcement device of an enforcement officer managing at least the parking facility. The enforcement officer can use the enforcement device to identify an optimal travel path based on the provided route for marking vehicles in violation of the parking policies. By providing the enforcement officer with the optimal route, the workforce can be optimized to efficiently navigate throughout the parking facilities and marking vehicles in violation of the parking policies.

The system can query various transaction solutions (e.g., payment solutions) associated with a facility. The system can receive transaction information associated with clients of one or more vehicles parked within the facility. The transaction information can include an indication of the payment amount received from the clients. Responsive to receiving sufficient payment from the clients, the system can map an event indicating a completed payment to the identification number of the respective vehicle. The system can map other events including violation or non-violation events to a vehicle linked to an identification number. The system can detect a vehicle transitioning away from an initial parking space where the vehicle was parked. The system can remove graphical content associated with the vehicle from the parking space upon the transition. The system can add graphical content to a different parking space relocated to by the vehicle. The system can detect the vehicle exiting the parking facility. The system can de-register the vehicle upon detecting that the vehicle exited the parking facility.

Thus, the systems, methods, and apparatus of this technical solution can provide enforcement officers with real-time monitoring of parking facilities, thereby improving the efficiencies and reducing time consumption for marking vehicles with violations within the facility by using the generated route. Further, the technical solution can improve real-time tracking of vehicles within the facility, increase the accuracy of locating the vehicles, and activities performed by the vehicles, thereby improving data reliability. Additionally, this technical solution can mitigate false alarms or improve the accuracy of alerting the enforcement officers of vehicles to be marked. Accordingly, the technical solution discussed herein can improve the efficiencies of marking vehicles and provide reliable data to authorized personnel to manage the facilities.

At least one aspect is directed to a system for real-time vehicular parking enforcement. The system can include a data processing system comprising one or more processors and memory. The data processing system can receive, via a network, data captured by one or more cameras, the one or more cameras positioned to monitor an access point of a parking facility and a plurality of parking spots within the parking facility. The data processing system can detect, based on the data captured by the one or more cameras, entry of a vehicle into the parking facility via the access point and a time stamp at which the vehicle enters the parking facility. The data processing system can determine, responsive to detection of the entry of the vehicle, an identification number for the vehicle via application of an image processing technique on the data captured by the one or more cameras. The data processing system can track, via the one or more cameras, the vehicle from the access point to a first parking spot of the plurality of parking spots. The data processing system can generate, responsive to the vehicle occupying the first parking spot, a parking event for the vehicle comprising an image of the vehicle, the identification number of the vehicle, and a time stamp corresponding to occupation of the first parking spot. The data processing system can establish, based on at least one of the time stamp at which the vehicle enters the parking facility and the time stamp corresponding to occupation of the first parking spot, a timer for querying a transaction processing system. The data processing system can query, via an application programming interface responsive to expiration of the timer, the transaction processing system for transaction information associated with the identification number of the vehicle. The data processing system can generate, based on the transaction information received responsive to the query and the parking event, a violation event for the vehicle. The data processing system can classify the violation event based on at least one of the time stamp at which the vehicle enters the parking facility, the parking event, or the transaction information. The data processing system can overlay, on a digital map of the parking facility comprising the plurality of parking spots, an icon on the first parking spot that indicates the classification of the violation event.

The data processing system can classify the violation event based on a duration of ticket expiration or an absence of transaction information. The data processing system can update the digital map of the parking facility in real-time based on the data streamed from the one or more cameras. The data processing system can provide the digital map for display on a computing device remote from the data processing system. The data processing system can provide, responsive to a request from the computing device, information stored in the parking event for display via the computing device.

The data processing system can provide the digital map for display on a computing device remote from the data processing system. The data processing system can receive, from the computing device, an indication that the violation event has been marked. The data processing system can update the icon overlaid on the digital map to indicate that the violation event at the first parking spot has been marked. The data processing system can determine, based on the data received from the one or more cameras subsequent to the indication that the violation event has been marked, the vehicle having the identification has exited the first parking spot. The data processing system can remove, responsive to the vehicle exiting the first parking spot, the icon indicating the violation event at the first parking spot.

The data processing system can detect the entry of the vehicle into the parking facility via the access point based on a direction of travel of the vehicle through the access point. The data processing system can detect, via the data captured by the one or more cameras, entry of a second vehicle into the parking facility. The data processing system can determine, based on the data captured by the one or more cameras, a second identification of the second vehicle. The data processing system can determine, based on a lookup in a data repository, that the second vehicle is exempt from transaction processing. The data processing system can disable a timer for the second vehicle responsive to the determination that the second vehicle is exempt from transaction processing.

The data processing system can assign, based on the data captured by the one or more cameras, violation events to a plurality of vehicles parked in a subset of the plurality of parking spots. The data processing system can classify the violation events assigned to the plurality of vehicles in the subset of the plurality of parking spots. The data processing system can provide, for display on a computing device, the digital map overlaid with a plurality of icons indicating the classification of the violation events assigned to the plurality of vehicles in the subset of the plurality of parking spots. The data processing system can rank the subset of the plurality of parking spots based on the classification of the violation events assigned to the plurality of vehicles. The data processing system can generate, based on the rank of the subset of the plurality of parking spots and a location of each the subset of the plurality of parking spots in the parking facility, a route to traverse the parking facility to mark the plurality of vehicles. The data processing system can provide, for display on the computing device, the digital map overlaid with the route.

At least one aspect is directed to a method for real-time vehicular parking enforcement. The method can include receiving, by a data processing system comprising one or more processors and memory, via a network, data captured by one or more cameras, the one or more cameras positioned to monitor an access point of a parking facility and a plurality of parking spots within the parking facility. The method can include detecting, by the data processing system, based on the data captured by the one or more cameras, entry of a vehicle into the parking facility via the access point and a time stamp at which the vehicle enters the parking facility. The method can include determining, by the data processing system, responsive to detection of the entry of the vehicle, an identification number for the vehicle via application of an image processing technique on the data captured by the one or more cameras. The method can include tracking, by the data processing system, via the one or more cameras, the vehicle from the access point to a first parking spot of the plurality of parking spots. The method can include generating, by the data processing system, responsive to the vehicle occupying the first parking spot, a parking event for the vehicle comprising an image of the vehicle, the identification number of the vehicle, and a time stamp corresponding to occupation of the first parking spot. The method can include establishing, by the data processing system, based on at least one of the time stamp at which the vehicle enters the parking facility and the time stamp corresponding to occupation of the first parking spot, a timer for querying a transaction processing system. The method can include querying, by the data processing system, via an application programming interface responsive to expiration of the timer, the transaction processing system for transaction information associated with the identification number of the vehicle. The method can include generating, by the data processing system, based on the transaction information received responsive to the query and the parking event, a violation event for the vehicle. The method can include classifying, by the data processing system, the violation event based on at least one of the time stamp at which the vehicle enters the parking facility, the parking event, or the transaction information. The method can include overlaying, by the data processing system, on a digital map of the parking facility comprising the plurality of parking spots, an icon on the first parking spot that indicates the classification of the violation event.

The method can include classifying, by the data processing system, the violation event based on a duration of ticket expiration or an absence of transaction information. The method can include updating, by the data processing system, the digital map of the parking facility in real-time based on the data streamed from the one or more cameras. The method can include providing, by the data processing system, the digital map for display on a computing device remote from the data processing system. The method can include providing, by the data processing system, responsive to a request from the computing device, information stored in the parking event for display via the computing device.

The method can include providing, by the data processing system, the digital map for display on a computing device remote from the data processing system. The method can include receiving, by the data processing system, from the computing device, an indication that the violation event has been marked. The method can include updating, by the data processing system, the icon overlaid on the digital map to indicate that the violation event at the first parking spot has been marked. The method can include determining, by the data processing system, based on the data received from the one or more cameras subsequent to the indication that the violation event has been marked, the vehicle having the identification has exited the first parking spot. The method can include removing, by the data processing system, responsive to the vehicle exiting the first parking spot, the icon indicating the violation event at the first parking spot.

The method can include detecting, by the data processing system, the entry of the vehicle into the parking facility via the access point based on a direction of travel of the vehicle through the access point. The method can include detecting, by the data processing system, via the data captured by the one or more cameras, entry of a second vehicle into the parking facility. The method can include determining, by the data processing system, based on the data captured by the one or more cameras, a second identification of the second vehicle. The method can include determining, by the data processing system, based on a lookup in a data repository, that the second vehicle is exempt from transaction processing. The method can include disabling, by the data processing system, a timer for the second vehicle responsive to the determination that the second vehicle is exempt from transaction processing.

The method can include assigning, by the data processing system, based on the data captured by the one or more cameras, violation events to a plurality of vehicles parked in a subset of the plurality of parking spots. The method can include classifying, by the data processing system, the violation events assigned to the plurality of vehicles in the subset of the plurality of parking spots. The method can include providing, by the data processing system, for display on a computing device, the digital map overlaid with a plurality of icons indicating the classification of the violation events assigned to the plurality of vehicles in the subset of the plurality of parking spots. The method can include ranking, by the data processing system, the subset of the plurality of parking spots based on the classification of the violation events assigned to the plurality of vehicles. The method can include generating, by the data processing system, based on the rank of the subset of the plurality of parking spots and a location of each the subset of the plurality of parking spots in the parking facility, a route to traverse the parking facility to mark the plurality of vehicles. The method can include providing, by the data processing system, for display on the computing device, the digital map overlaid with the route.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
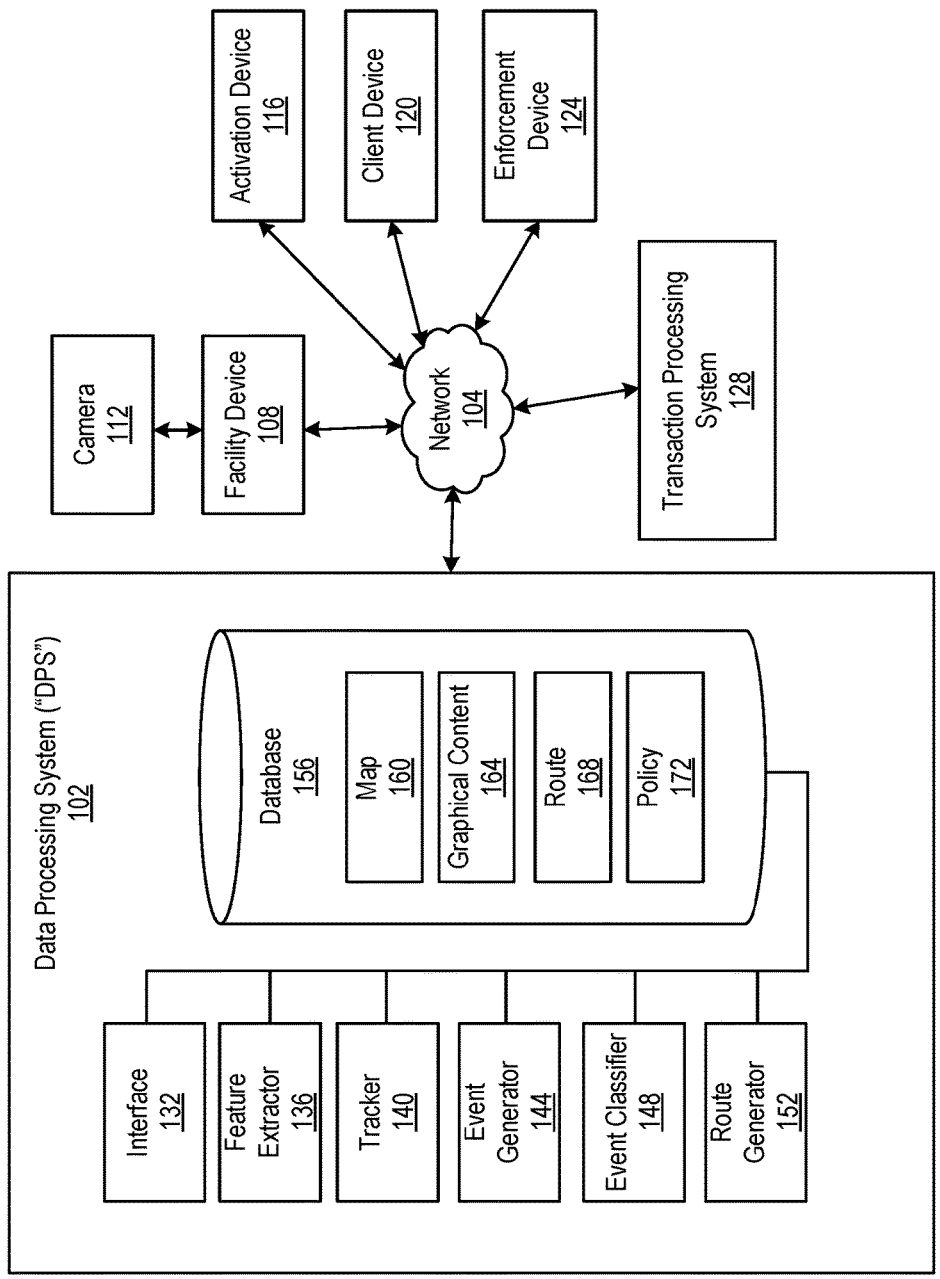
FIG. 1 is a block diagram of an example system of real-time vehicular parking enforcement, in accordance with an implementation.

Following below are more detailed descriptions of various concepts related to, and implementations of, systems, methods, and apparatus for real-time vehicular parking enforcement. The various concepts introduced above and discussed in greater detail below may be implemented in any of numerous ways.

This technology is directed to systems, methods, and apparatus of real-time vehicular parking enforcement monitor. The system can provide real-time information on various parking facilities to enforcement devices used by parking enforcement officers. For example, the system can provide a user interface to the enforcement devices to display indications of any vehicle that has not paid for parking, parked at a restricted slot, among other violations or status of parking facilities. The system can include one or more cameras to capture various images or record videos within or around the vicinity of the parking facility. The system can register vehicles accessing the facility based on the identification number of the respective vehicles. The system can track parking space occupancy including allocated empty and occupied slots within the facilities. The system can capture the identification numbers of vehicles and track parking space occupancy using cameras and video analytics. The system can capture other activities or events of the vehicles, such as logging the locations of parked vehicles.

The system can be used to enforce a pay-by-plate policy for vehicles parking in the facility, which can include referencing the identification number of the vehicle for any parking violation. To verify the status of payment from clients of the respective vehicles, the system can query various transaction processing systems associated with the parking facility to obtain transaction details linked to the identification number of each registered vehicle. The system can map one or more graphical content to parked vehicles, such as an icon indicating an event of parking violation, on an application having a user interface displaying various parking events. This application can be accessed via an enforcement device. In some cases, the system can provide graphical content associated with one or more parked vehicles on various monitored sites managed by the operator of the parking facility.

The system can generate an optimal route based on the parking events within one or more facilities. The system can provide the optimal route to an enforcement device of an enforcement officer managing at least the parking facility. The enforcement officer can use the enforcement device to identify an optimal travel path based on the provided route for marking vehicles in violation of the parking policies. By providing the enforcement officer with the optimal route, the workforce can be optimized to efficiently navigate throughout the parking facilities and marking vehicles in violation of the parking policies.

The system can provide an application for clients to make payments for parking within the facility. The system can receive payment from clients. Responsive to receiving sufficient payment from the clients, the system can map an event indicating a completed payment to the identification number of the respective vehicle. The system can map other events including violation or non-violation events to a vehicle linked to an identification number. The system can detect a vehicle transitioning away from an initial parking space where the vehicle was parked. The system can remove graphical content associated with the vehicle from the parking space upon the transition. The system can add graphical content to a different parking space relocated to by the vehicle. The system can detect the vehicle exiting the parking facility. The system can de-register the vehicle upon detecting that the vehicle exited the parking facility.

Thus, the systems, methods, and apparatus of this technical solution can provide enforcement officers with real-time monitoring of parking facilities, thereby improving the efficiencies and reducing time consumption for marking vehicles with violations within the facility by using the generated route. Additionally, this technical solution can mitigate the non-payment of certain parked vehicles without impacting the ingress and egress times for vehicles, unlike the utilization of gated access points. Further, in the perspective of disease infection prevention, this technical solution can reduce physical contact with local ticketing or transaction machines by providing an application accessible via client devices for parking payment, thereby improving the user experience during the transaction process.

Referring now to FIG. 1, a block diagram of an example system of real-time vehicular parking enforcement, in accordance with an implementation, is shown. The system 100 can include at least one data processing system ("DPS") 102, at least one network 104, at least one facility device 108, one or more cameras 112, at least one activation device 116, one or more client devices 120, at least one enforcement device 124, and at least one transaction processing system 128. The components (e.g., DPS 102, network 104, facility device 108, camera 112, activation device 116, client device 120, enforcement device 124, or transaction processing system 128) of the system 100 can be implemented or composed of hardware, software, or a combination of hardware and software components, such as communications buses, circuitry, processors, communications interfaces, among others. The components of the system 100 can communicate or transmit data to other components or devices within the system 100 via the network 104. For example, the DPS 102 can communicate data with at least one of the facility device 108, the activation device 116, the client device 120, the enforcement device 124, or the transaction processing system 128 via the network 104. In some cases, the one or more components of the system 100 can transmit or receive data from other networks.

The network 104 can include computer networks such as the Internet, local, wide, metro or other area networks, intranets, satellite networks, other computer networks such as voice or data mobile phone communication networks, and combinations thereof. The network 104 may be any form of computer network that can relay information between the one or more components of the system 100. The network 104 can relay information between client devices 120 and one or more information sources, such as web servers or external databases, amongst others. In some implementations, the network 104 may include the Internet and/or other types of data networks, such as a local area network (LAN), a wide area network (WAN), a cellular network, a satellite network, or other types of data networks. The network 104 may also include any number of computing devices (e.g., computers, servers, routers, network switches, etc.) that are configured to receive and/or transmit data within the network 104. The network 104 may further include any number of hardwired and/or wireless connections. Any or all of the computing devices described herein (e.g., DPS 102, network 104, facility device 108, camera 112, activation device 116, client device 120, enforcement device 124, transaction processing system 128, etc.) may communicate wirelessly (e.g., via WiFi, cellular, radio, etc.) with a transceiver that is hardwired (e.g., via a fiber optic cable, a CAT5 cable, etc.) to other computing devices in the network 104. Any or all of the computing devices described herein (e.g., DPS 102, network 104, facility device 108, camera 112, activation device 116, client device 120, enforcement device 124, transaction processing system 128, etc.) may also communicate wirelessly with the computing devices of the network 104 via a proxy device (e.g., a router, network switch, or gateway).

The facility device 108 can include or sometimes be referred to as a local computing device located within or near the parking facility. The facility device 108 can include or sometimes be referred to as a ticket dispenser or machine. The facility device 108 can include at least one processor and a memory. The facility device 108 can include or be constructed with hardware, software, or a combination of hardware and software components. The facility device 108 can be connected to the camera 112. The facility device 108 can connect to the camera 112 via physical cables or wirelessly, such as Bluetooth or Wi-Fi, among other wireless connection techniques. In some cases, the facility device 108 can include a computer used by operators to manage or monitor the facility via live feed from the camera 112. In some other cases, the facility device 108 can be an intermediary device to transfer data from the camera 112 to the DPS 102 or other components of the system 100.

The facility device 108 can be located inside or within proximity of the facility. For example, the facility device 108 can be located inside an operating room within the facility accessible by the operator, employees, or personnel of the facility. In some cases, the facility device 108 can be located near the facility, such as in a parking booth at the entrance or exit of the facility. The facility device 108 can store footage from the camera 112. The facility device 108 can provide video or image feeds from the camera 112 to the DPS 102 for processing. In some cases, the facility device 108 can receive a request from the DPS 102 to obtain at least a subset of the stored feed for processing. Responsive to the request, the facility device 108 can transmit the camera data to the DPS 102.

In some cases, the facility device 108 can be used to control the camera 112. For example, the facility device 108 can update the software of the camera 112. Updating the software can include updating the software version or adjusting the settings of the camera 112. The settings can include gamma, contrast, brightness, etc. In another example, the facility device 108 can transmit instructions to the camera for adjusting the capturing angle, such as the orientation or position of the camera 112. In some cases, the facility device 108 can power the camera 112 on or off.

The camera 112 can include or be a video camera, surveillance camera, or other types of cameras within a parking facility to capture images or record videos. The camera 112 can capture black and white image frames or colored image frames. The camera 112 can be installed or pre-installed within or in the vicinity of the facility. For example, the camera 112 can include a surveillance camera pre-installed within the facility. The surveillance camera can be used by operators to determine the activities within the facility. In another example, the camera 112 can include a video camera with wireless capabilities which can be installed in the facility. The camera 112 can be capable of transmitting data either through cable or wirelessly to the facility device 108 for capturing and storing image or video feeds. In some cases, the camera 112 can transmit data directly to the DPS 102. For example, instead of relaying data from the camera 112 to the DPS 102 through the facility device 108, the camera 112 can communicate directly with the DPS 102 to provide data feeds.

The camera 112 can be located anywhere within or in the vicinity of the facility. For example, the camera 112 can be installed at, near, or outside the entrance (or access point) to capture images of vehicles entering the facility. The camera 112 can be located at the exit of the facility, on the ceiling of each floor, at the walls or pillars, among other locations in the facility. For example, the camera 112 can be an overview camera placed at a higher position at the facility to provide footage of the parking slots or vehicles navigating through the facility. Multiple cameras 112 within the facility can provide an overlaying field of vision. For example, a first camera can provide a first field of vision of the facility and a second camera can provide a second field of vision of the facility. At least a portion of the first field of vision can overlap with the second field of vision, such that the first camera, the second camera, and other cameras 112 can provide panorama views of the facility.

In some cases, the camera 112 can activate, initiate recording, or capturing of image frames in response to sensing an object. For example, the camera 112 can include functionalities of a motion sensor, whereby the camera 112 can start capturing and storing images upon identifying movement within the parking facility. In some cases, the camera 112 can capture images continuously unless instructed by the operator of the facility.

The activation device 116 can include or sometimes be referred to as a ticket dispenser or machine. The activation device 116 can include at least one processor and a memory. The activation device 116 can include or be constructed with hardware, software, or a combination of hardware and software components. The activation device 116 can be located within or near the facility. For example, the activation device 116 can be located at the access points of the facility. In another example, the activation device 116 can be located near the exit of the facility. The activation device 116 can issue a ticket for accessing or parking within the facility, such as at one of the predetermined slots in the facility. In some cases, the activation device 116 can receive or accept the ticket from the client when exiting the facility.

In some cases, the facility can be pre-equipped with a gate. The activation device 116 can be located at the entrance outside of the gate. A client of a vehicle can open the gate by requesting a ticket from the activation device 116. Responsive to receiving a request, the gate can be open based on a signal from the activation device 116 or the facility device 108 indicating that a ticket has been issued. For example, the gate may be in communication with or electrically connected to the facility device 108. In this example, the activation device 116 can transmit the signal to the facility device 108 for relaying to the gate. In another example, the activation device 116 can be electrically connected to or in communication with the gate. In this case, the activation device 116 can send a signal directly to the gate to open for the vehicle to enter.

In further example, the activation device 116 can be located at the exit of the facility. If the exit is blocked by a gate, the activation device 116 can open the exit gate upon receiving a paid ticket from the client of the vehicle. For example, the client can use the client device 120 to pay for the ticket issued by the activation device 116. When exiting the facility, the client can return or scan the ticket at the activation device 116 at the exit gate. In response to confirming that the ticket has been completed (e.g., paid), the gate can open for the vehicle to egress. In some cases, if the ticket is not completed, the activation device 116 may not open the gate. In some other cases, the activation device 116 can include one or more features of the client device 120 or vice versa. For example, the activation device 116 can facilitate the completion of the ticket at the exit gate, such as providing a transaction solution at the exit gate.

Upon requesting a ticket, the activation device 116 can transmit a signal to at least one of the transaction processing system 128 or the DPS 102 to initiate a timer. The timer can be used to determine whether the client has paid for the ticket within a grace period. If the client paid for the ticket, the timer can be canceled, stopped, or removed. In some cases, if the signal is transmitted to the transaction processing system 128, the transaction processing system 128 can inform or forward the signal to the DPS 102. Generating and providing the ticket to the client can indicate at least that a vehicle is accessing the facility. In some cases, the activation device 116 can transmit a signal to the DPS 102 to register a vehicle at the entrance of the facility in response receive a request for a ticket.

The client device 120 can include at least one processor and a memory, e.g., a processing circuit. The client device 120 can include various hardware or software components, or a combination of both hardware and software components. The client devices 120 can be constructed with hardware or software components. For example, the client devices 120 can include, but is not limited to, a mobile device, smartphone, personal computer, a laptop, a gaming device, a kiosk, or any other type of computing device.

The client device 120 can include, store, execute, or maintain various application programming interfaces ("APIs") in the memory (e.g., local to the client device 120). The APIs can include or be any types of API, such as Web APIs (e.g., open APIs, Partner APIs, Internal APIs, or composite APIs), web server APIs (e.g., Simple Object Access Protocol ("SOAP"), XML-RPC ("Remote Procedure Call"), JSON-RPC, Representational State Transfer ("REST")), among other types of APIs or protocol. The client device 120 can use at least one of various protocols for transmitting data to one or more remote devices. The protocol can include at least a transmission control protocol ("TCP"), a user datagram protocol ("UDP"), or an internet control message protocol ("ICMP"). The data can include a message, a content, a request, or otherwise information to be transmitted from the client device 120 to remote computing devices, such as the DPS 102, transaction processing system 128, or other devices within the network 104.

The client device 120 can be owned by a client of a vehicle. For example, the client device 120 can include a mobile device of the client. In some cases, the client device 120 can be owned by an entity managing the parking facility. For example, the client device 120 can include a kiosk or transaction machine. The client device 120 can include or be a part of the activation device 116, such as shared features or functionalities as the activation device 116. The client device 120 can be used to access an application for processing transactions. The application can establish a communication channel with the transaction processing system 128. In some cases, the application can establish a communication channel with the DPS 102. The client device 120 can be used to provide transaction information to the transaction processing system 128. For example, the client device 120 can install an application of the parking facility. The application can include a transaction interface for receiving at least parking information and transaction information of the client. In some cases, the client device 120 can access a similar interface using a web browser. The parking information can include at least an identification number of the vehicle, such as a license plate number. The parking information may include color, make, or model, among other features of the vehicle. The transaction information can include at least the payment method or payment information (e.g., card number, expiration date, etc.), for example.

In another example, features or functionalities of the application can be included in the kiosk. In this example, the client can alternatively identify a kiosk located within or near the facility. The client can provide payment to the kiosk similar to the application. Using the kiosk, the client can have options to complete the ticket using physical currency (e.g., cash) or digital currency (e.g., credit card, debit card, electronic wiring, etc.). In some cases, the client device 120 can include features or functionalities of the activation device 116. In this case, the client device 120 can act as a two-in-one device for providing a ticket (e.g., physical or digital tickets) and completing the ticket. The ticket can include any information similar to a parking facility ticket. The parking facility ticket may or may not be the same as a parking ticket. For example, the parking facility ticket can be issued by the activation device 116 local to the facility. The parking ticket can be issued by an enforcement officer to vehicles with parking violation, for example.

The enforcement device 124 can include at least one processor and a memory, e.g., a processing circuit. The enforcement device 124 can include various hardware or software components, or a combination of both hardware and software components. The enforcement device 124 can be constructed with hardware or software components. For example, the enforcement device 124 can include, but is not limited to, a mobile device, smartphone, personal computer, a laptop, a gaming device, or any other type of computing device.

The enforcement device 124 can be constructed with hardware, software, or a combination of hardware and software components similar to the client device 120. For example, the enforcement device 124 can include, store, execute, or maintain various application programming interfaces ("APIs") in the memory (e.g., local to the enforcement device 124). The APIs can include or be any types of API, such as Web APIs (e.g., open APIs, Partner APIs, Internal APIs, or composite APIs), web server APIs (e.g., Simple Object Access Protocol ("SOAP"), XML-RPC ("Remote Procedure Call"), JSON-RPC, Representational State Transfer ("REST")), among other types of APIs or protocol. The enforcement device 124 can use at least one of various protocols for transmitting data to one or more remote devices. The protocol can include at least a transmission control protocol ("TCP"), a user datagram protocol ("UDP"), or an internet control message protocol ("ICMP"). The data can include a message, a content, a request, or otherwise information to be transmitted from the enforcement device 124 to remote computing devices, such as the DPS 102, transaction processing system 128, or other devices within the network 104.

The enforcement device 124 can be used by an enforcement officer (e.g., parking enforcement officer). The enforcement device 124 can receive a real-time overview of the parking operation, such as a graphical user interface displaying the facility, slot occupancy, or violations incurred by vehicles, location of the slots occupied by the vehicles with violations, among other icons, features, or graphic content discussed herein. Further, the enforcement device 124 can receive statuses within the facility, such as total vehicles within the facility, number of slots occupied out of the predetermined number of slots, historical statistics of the number of vehicles accessing the lot, etc. The enforcement device 124 can receive transaction status for individual vehicles from the transaction processing system 128. The enforcement device 124 can receive event data from the DPS 102. The enforcement device 124 can receive other information from at least the transaction processing system 128 or the DPS 102.

In some cases, the enforcement device 124 can receive data from the facility device 108. For example, the enforcement device 124 can receive video feed or images from the facility device 108. The enforcement officer can use the enforcement device 124 to determine any violation that occurred based on the feed provided by the facility device 108. In some cases, the enforcement device 124 can receive all indications of violations to the parking policies from the DPS 102.

The enforcement device 124 can display a map of the facility to the enforcement officer. The map can be a part of the graphical user interface provided to the enforcement device 124 by the DPS 102. The map can include a route indicating an optimal path for marking vehicles having at least one violation. The route can facilitate navigation within a facility. The route can facilitate navigation to different facilities to efficiently mark vehicles with violations. For example, the enforcement device 124 can provide a route for the enforcement officer to follow when navigating to mark vehicles. The enforcement device 124 can provide alternative routes configurable by the enforcement officer, such as based on the distance to different facilities, traffic flow, number of violations, or priority of the facilities.

Marking vehicles can include or refer to the enforcement officer issuing a parking ticket to a vehicle. The enforcement device 124 can be used by the enforcement officer to confirm that the vehicle has been marked, such as by pressing on one or more interactive elements provided in the user interface (not shown). The interactive element can include or be used to at least close the map, generate a route, re-calculate route, close route, mark a vehicle, unmark a vehicle, report vehicle, provide feedback of the application (e.g., issues with application or interface, etc.), among other interactive features. The route can be generated by the DPS 102 based on at least vehicular events or violation ranking of different facilities as discussed herein.

In some cases, the enforcement device 124 can be used to record the vehicle identification number ("VIN") or other features of the vehicle. The enforcement device 124 can upload or transmit information to the DPS 102 or the transaction processing system 128. The enforcement device 124 can be updated in real-time, such as during a route to enforce parking tickets to one or more vehicles. For example, during navigation to mark vehicles, the enforcement device 124 can be updated with payment from a client of the vehicle. Hence, the violation associated with the vehicle can be removed during navigation to the vehicle. Further, the enforcement device 124 can update the map with new violations received from the DPS 102 or the transaction processing system 128. The updated map may or may not include an updated route based on the locations of the new violations, such as based on the severity or rank of the violation or whether the location is already along the route.

In some cases, the enforcement device 124 can notify or alert the enforcement officer to proceed to mark vehicles. For example, the enforcement device 124 can receive a notification from the DPS 102 indicating any new violation. In some cases, the enforcement device 124 can receive a notification based on new violations exceeding a threshold, such as 5 new violations in a first facility or 10 new violations in a second facility. In some cases, the enforcement device 124 can be configured or pre-programmed with a timer indicating to proceed with routine enforcement procedures, such as every hour, 2-hours, 3-hours, etc. In some cases, the enforcement device 124 can receive an alert based on the type of violation event assigned to a respective vehicle or parking slot. For example, the enforcement device 124 can alert the enforcement officer of a new violation event indicating an incomplete transaction subsequent to timer expiration. In this example, the enforcement device 124 may not alert the enforcement officer of a different type of violation event, such as parking in a restricted area. This violation of the restricted area parking can appear on the display of the enforcement device 124.

In some cases, the enforcement device 124 can provide a periodic alert to the enforcement officer based on a timer (e.g., periodic timer). The timer can be configured by the enforcement officer or facility operator, such as 30 minutes, 1 hour, 2 hours, 4 hours, etc. For example, the timer can be configured to 1 hour, where an alert event can be triggered. The enforcement device 124 can receive any indication of one or more violation events from the DPS 102, such as during the timer period of 1 hour in this case. Upon determining, by the enforcement device 124, that at least one violation event is received within the timer period, the enforcement device 124 can alert the enforcement officer of the new event. If no event is received within the timer period, the enforcement device 124 may not provide an alert. The timer can restart or reinitiate in response to the timeout for subsequent notification. In some cases, unmarked events can be notified, such as unmarked events received during or prior to the timer duration. In some cases, the enforcement device 124 can alert the enforcement officer in response to receiving at least one new event, where the new event is transmitted by the DPS 102 based on at least one of a timer, a generation of the new event, a type of violation event, or an accumulated number of new events (e.g., 5, 10, 20 new events, etc.). Therefore, the DPS 102 can manage when to alert or notify the enforcement officer via the enforcement device 124 to prevent erroneous or too many alarms from being shown.

The transaction processing system 128 can include or sometimes be referred to as a transaction processing server. The transaction processing system 128 can include at least one processor and a memory, e.g., a processing circuit. The transaction processing system 128 can include various hardware or software components, or a combination of both hardware and software components. The transaction processing system 128 can be constructed with hardware or software components. For example, the transaction processing system 128 can include, but is not limited to, a cloud computing device, a remote server, or other computing devices.

In further example, the transaction processing system 128 can include, store, execute, or maintain various application programming interfaces ("APIs") in the memory (e.g., local to the transaction processing system 128). The APIs can include or be any types of API, such as Web APIs (e.g., open APIs, Partner APIs, Internal APIs, or composite APIs), web server APIs (e.g., Simple Object Access Protocol ("SOAP"), XML-RPC ("Remote Procedure Call"), JSON-RPC, Representational State Transfer ("REST")), among other types of APIs or protocol. The transaction processing system 128 can use at least one of various protocols for transmitting data to one or more devices within the system 100. The protocol can include at least a transmission control protocol ("TCP"), a user datagram protocol ("UDP"), or an internet control message protocol ("ICMP").

The transaction processing system 128 can include or be referred to as a transaction solution (e.g., payment solution). For example, the transaction processing system 128 can include any technology, device, or platform for receiving or accepting client transactions. The transaction processing system 128 can be a remote server or a remote computing device in communication with at least one of the activation device 116 or the client device 120 to receive transaction information. For example, the transaction processing system 128 can communicate with a local kiosk of the facility, mobile transaction solutions, or mobile applications to collect transaction information from clients of the vehicles using the facility. The transaction processing system 128 can receive and use an identification number of the vehicle as a reference for associating the transaction data with the respective vehicle parking in a slot.

The transaction processing system 128 can determine whether a transaction is completed for a client based on the ticket information. The ticket information can include at least a request time (e.g., a time that the client requested the ticket), issue time (e.g., time the ticket is printed), ticket number, facility policies, or a barcode, such as code 39, code 128, universal product code ("UPC"), quick response ("QR") code, etc. In some cases, the ticket information can include the identification number of the vehicle captured by the camera 112. The identification number can be provided to the activation device 116 by the DPS 102 or the facility device 108, for example. The transaction processing system 128 can receive the identification number of the vehicle provided by the client during the transaction process. The transaction processing system 128 can calculate the parking cost for the respective identification number.

For example, the transaction processing system 128 can determine the cost for completing the transaction based on a difference between the payment time and either the time the ticket was requested or issued. In this case, the transaction can be based on hourly access to the facility. In another example, the transaction processing system 128 can identify the cost to be per entry, such that the client should pay within a predetermined grace period, such as 15 minutes, 30 minutes, 1 hour, etc. The transaction processing system 128 may increase the per entry cost based on the duration over the grace period.

The transaction processing system 128 can identify the total amount received from the activation device 116 or the client device 120. The transaction processing system 128 can determine whether the amount received satisfies the determined parking cost. The transaction processing system 128 can transmit the status of the payment to the DPS 102 based on the transaction information discussed hereinabove. In some cases, the transaction processing system 128 may delegate one or more tasks to the DPS 102. For example, the transaction processing system 128 can transmit transaction information including the received transaction amount associated with provided identification numbers. In this example, the transaction processing system 128 can delegate the task of determining payment statuses of all vehicles within the facility, based on the received transaction information. In another example, the DPS 102 can include the vehicular event data, such as a time the vehicle enters the facility, a time parked within a slot, etc. In some cases, the DPS 102 can determine the parking cost based on when the vehicle is parked in a slot, for example.

The transaction processing system 128 can communicate transaction data with one or more devices of the system 100 via an application programming interface ("API") connection. The API can include or refer to a connection between one or more devices, programs, or applications. For example, the transaction processing system 128 can connect to the DPS 102, the activation device 116, the client device 120, or the application executing on at least the client device 120 via an API. The transaction processing system 128 can receive transaction information from at least one of the activation device 116 or the client device 120. The transaction processing system 128 can contact a remote device or a remote server, such as a server of a financial institution, to complete the transaction using the transaction information.

In some cases, the transaction processing system 128 can receive payment from the client to increase the time for parking within the slot (e.g., 1 dollar can provide 30 minutes of parking, etc.). Based on a timeout (e.g., out of time for the payment amount), which can be identified by the DPS 102 based on the transaction information, such as payment received compared to parking duration, an event can be generated and classified by the DPS 102. Hence, the transaction processing system 128 can provide transaction solution data to the DPS 102 for processing to determine and generate events or violations.

The DPS 102 can sometimes be referred to as a recognition unit, parking monitor, computing device, or data processing server. The DPS 102 can include one or more processors and one or more memories configured to perform the features or functionalities of video analytics, image recognition, event logging, route calculation, among others. The DPS 102 can include at least one interface 132, at least one feature extractor 136, at least one tracker 140, at least one event generator 144, at least one event classifier 148, at least one route generator 152, and at least one database 156. The components (e.g., interface 132, feature extractor 136, tracker 140, event generator 144, event classifier 148, route generator 152, or database 156) of the DPS 102 can be hardware, software, or a combination of hardware and software components.

The components of the DPS 102 can be electrically connected to other components of the DPS 102 to communicate or relay information. For example, the interface can 132 can relay data received from at least one of the components of the system 100 via the network 104 to at least the feature extractor 136, the tracker 140, the event generator 144, the event classifier 148, the route generator 152, or the database 156. Further, individual components of the DPS 102 can forward processed data to other components of the DPS 102. For example, the feature extractor 136 can process the data received from the interface 132 and forward the processed data (e.g., extracted features) to the tracker 140, event generator 144, or other components.

The DPS 102 can be located locally within the facility or external to the facility. Further, the DPS 102 can include or perform features or functionalities as one or more devices located locally or remote from the facility. For example, the DPS 102 can perform or include one or more features or functionalities similar to the facility device 108 located locally in the facility. In another example, the DPS 102 can include or perform features or functionalities similar to a remote computing device or a remote server located remotely from the facility. In some cases, the DPS 102 can include features or functionalities of the transaction processing system 128. In some cases, the DPS 102 can delegate one or more features, functions, or tasks to other devices, such as a remote server or dedicated computing devices to perform specific features.

The interface 132 can be used to establish a connection to the network 104. For example, the interface 132 can interface with the network 104, devices or components within the system 100 (e.g., facility device 108, camera 112, activation device 116, client device 120, enforcement device 124, or transaction processing system 128), or components of the DPS 102. The interface 132 can include features and functionalities of any communication interface to interface with the aforementioned components. For example, the interface 132 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 132 can include at least a built-in network adapter, network interface card, PCMCIA network card, EXPRESSCARD network card, card bus network adapter, wireless network adapter, USB network adapter, modem, or any other device suitable for interfacing one or more devices within the system 100 to any type of network capable of communication.

The interface 132 can communicate with one or more aforementioned components to receive data from or transmit data to various components of the system 100. For example, the interface 132 can receive transaction information from the transaction processing system 128 for processing. In some cases, the interface 132 can receive transaction information or ticket information directly from the activation device 116 or the client device 120. In another example, the interface 132 can transmit processed or generated data to the enforcement device including, but not limited to, a map of one or more facilities and a route for navigation to or within the facilities.

The feature extractor 136 can receive data captured by the one or more cameras 112. The data can include images or frames captured at different angles and locations of the facility. For example, the feature extractor 136 can receive data from at least one camera 112 positioned to monitor an access point of the parking facility. The access point can include the entrance and the exit of the facility. In further example, the feature extractor 136 can receive data from one or more cameras 112 positioned to monitor the parking spots within the facility, which can include the paths leading to the parking spots. The parking spots can include or be referred to as parking spaces, slots, or areas. The feature extractor 136 can receive the data directly from the cameras 112 or through the facility device 108 via the network 104.

The feature extractor 136 can receive footage of a vehicle at the access point of the facility. The facility can be an indoor or outdoor facility. The facility can include or be referred to as a compound, garage, or parking lot. For example, the feature extractor 136 can retrieve or obtain data from at least one camera 112 positioned to capture images of vehicles entering or exiting the facility via the access point. In this case, the camera 112 can capture the front or the back of the vehicle to identify the identification number of the vehicle. The identification number can include or correspond to a license plate number. In some cases, the identification number can include or correspond to other numbers identifying the vehicle, such as the vehicle identification number ("VIN").

The feature extractor 136 can receive footage of the vehicle traversing in the facility via the cameras 112 located throughout the facility. The feature extractor 136 can receive data having overlaying image frames from the cameras 112. For example, the various cameras 112 can provide overlaying fields of vision, which can be used to track the vehicle from the entrance to at least one of the parking spots within the facility.

The feature extractor 136 can detect entry of a vehicle based on the data captured by the one or more cameras 112, such as the camera 112 positioned to monitor the access point. The feature extractor 136 can detect or identify a timestamp at which the vehicle enters or accesses the facility. For example, the feature extractor 136 can execute one or more video analytics techniques or tools, such as fixed algorithm analytics, artificial intelligence learning algorithms, or recognition systems. By using the video analytics, the feature extractor 136 can determine various activities of the vehicle based on the captured data from the camera 112. In this case, the feature extractor 136 can use video analytics to determine or detect the entry of the vehicle into the facility via the access point. Upon detection of the entry of the vehicle, the feature extractor 136 can identify a timestamp corresponding to the time the vehicle enters the facility. The feature extractor 136 can use the video analytics technique to extract, obtain, or identify other features or activities of the vehicle, as discussed herein. In some cases, the video can be processed by a video analytics software installed on the facility device 108. In this case, the DPS 102 can receive, retrieve, or obtain the processed video from the facility device 108.

The feature extractor 136 can detect the entry of the vehicle based on the location of the vehicle one of the access points. Further, the feature extractor 136 can detect the direction of the vehicle or features indicating the front or the face of the vehicle. Based on the direction of the vehicle at the access point, the feature extractor 136 can detect that the vehicle is entering or entered into the facility. In another example, the feature extractor 136 can detect the vehicle exiting the facility. For example, the feature extractor 136 can detect the direction of the vehicle or features indicating the rear or the back of the vehicle. The feature extractor 136 can detect that the vehicle is moving out of the facility at the access point. Accordingly, the feature extractor 136 can detect the ingress and egress of the vehicle in or out of the facility. In some cases, the feature extractor 136 can detect the vehicle reversing into the facility or reversing out of the facility, such as entering the facility with the rear of the vehicle facing the camera or exiting the facility with the front of the vehicle facing the camera. In some cases, the camera 112 can be positioned at the access point, such that the front (or back) of the vehicle can be captured when entering the facility or leaving the facility.

The feature extractor 136 can determine an identification number for the vehicle. The feature extractor 136 can perform the determination of the identification number responsive to detecting the entry of the vehicle. In some cases, the feature extractor 136 can determine the identification number of the vehicle responsive to detecting that the vehicle is exiting or exits the facility. The feature extractor 136 can perform the determination of the identification number via the application of an image processing technique. For example, the feature extractor 136 can perform the image processing technique on the image frames captured by the one or more cameras 112. The image processing technique can include or be a part of the video analytics technique. For example, the image processing technique can include a license plate recognition software, auto license plate reader ("ALPR"), artificial intelligence ("AI") based software, etc. The AI-based software or ALPR can enable an object detection-based triggering mechanism to initiate capturing of the identification number. The feature extractor 136 can use the image processing technique to perform feature extraction, pattern recognition, objection detection, etc.

In further example, the feature extractor 136 can determine the identification number of the vehicle by detecting an object on the vehicle representing a license plate. The feature extractor 136 can analyze and extract the identification number presented within the license plate. The feature extractor 136 can associate the identification number to the vehicle, thereby having the identification number representing the vehicle. The feature extractor 136 or other components (e.g., tracker 140, event generator 144, event classifier 148, or route generator 152) of the DPS 102 can refer to the vehicle based on the associated identification number.

The feature extractor 136 may not extract the identification number of vehicles passing or outside the facility, such as vehicles not entering the facility. Instead, the feature extractor 136 can execute video analytics to determine that the vehicle is entering the facility. Upon entering the facility, the feature extractor 136 can trigger a mechanism to extract an identification number of the vehicle. For example, responsive to detecting that the vehicle is entering or entered into the facility based at least on the travel direction, the feature extractor 136 can execute an object detection technique using a neural network, among other image processing techniques, to locate and extract the identification number. Accordingly, the feature extractor 136 can obtain the identification number of the vehicle entering the facility, such as based on the direction of the vehicle.

The feature extractor 136 can register or store the identification number of the vehicle in the database 156. The identification number can be used to represent the features, activities, or events of the vehicle. For example, the feature extractor 136 can store information of the vehicle in the database 156 associated with the identification number. The feature extractor 136 can store the identification number in a hash table, where the identification number can be used as an index in the hash table. To retrieve, access, or update information associated with the vehicle, the feature extractor 136 can identify the identification number of the vehicle and access the table using the identification number. The feature extractor 136 can register the vehicle to keep track of any activities, events, or violations incurred by the vehicle or the client of the vehicle.

In some cases, the feature extractor 136 can transmit an image (e.g., cropped or processed image) of an object representing the license plate to a remote computing device or a remote server. In some other cases, the feature extractor 136 can transmit an image of the vehicle including the object representing the license plate to a remote computing device or a server. For example, the feature extractor 136 can delegate the task of identification number extraction or license plate recognition to a remote computing device performing at least one of the image processing techniques. In this example, the feature extractor 136 can receive the extracted identification number from the remote computing device. In some other cases, the facility device 108 receiving data from the camera 112 can be installed with at least one of the image processing techniques to determine the identification number of the vehicle. In this case, the feature extractor 136 can receive the identification number from the facility device 108.

The feature extractor 136 can determine that the vehicle having the identification number exited the facility. The feature extractor 136 can determine that the vehicle is exiting or exited the facility based on the data received from the one or more cameras 112. In some cases, the feature extractor 136 may deregister the identification number from the database 156. For example, the feature extractor 136 may deregister the identification number based on completed transaction information associated with the identification number. In some other cases, the feature extractor 136 can maintain or may not deregister the identification number of the exited vehicle based on an indication that the transaction information associated with the identification number is not completed (e.g., unpaid amount, remaining balance, includes at least one violation, or has been marked by an enforcement officer).

In some cases, the information associated with the identification number can be synced to other facilities implemented or connected to the DPS 102 or other similar processing systems. In some cases, feature extractor 136 can share the identification number of the vehicle, including information associated with the identification number, to systems of other facilities. In some cases, the database 156 can be a centralized data repository for various facilities, where data can be processed by the DPS 102. In this case, storing data within the database 156 can responsively share data to other facilities. The feature extractor 136 can detect entry or exits other vehicles and determine the identification numbers for the respective vehicles accessing the facility.

The feature extractor 136 can determine or extract the make, model, color, or other features of the vehicle. The feature extractor 136 can store the features of the vehicle in the database 156 in association with the identification number of the vehicle. The feature extractor 136 can obtain or receive the timestamps along with the individual image frames. The feature extractor 136 can transmit the vehicular information or images of vehicles to the tracker 140 to track the vehicle throughout the facility.

The tracker 140 can track the vehicle from the access point of the facility to other locations throughout the facility, such as one of the parking spots until the vehicle exited the facility or is absent from view of the cameras 112. The tracker 140 can track the vehicle through the one or more cameras 112. The tracker 140 can receive data directly from the camera 112 via the network 104, from the facility device 108, or from the feature extractor 136. In some cases, the tracker 140 can retrieve image data from the database 156.

For example, the tracker 140 can identify, from footages of the camera 112 at the access point and one or more cameras 112 within the facility, the location of the vehicle throughout the facility. In some cases, the tracker 140 can use one or more image processing techniques or video analytics to identify the location of the vehicle based on the data from the camera 112. The tracker 140 can identify the vehicle is parked in a parking spot. For example, the tracker 140 can identify the parking spots within the facility highlighted with road points. In another example, the tracker 140 can be pre-configured or pre-programmed with indications of the parking spots within the facility. Therefore, the tracker 140 can determine that the vehicle is parked within a parking spot based on the vehicle being encapsulated, at least in part, within the indicated or identified parking spaces. In some cases, the parking spot can be reserved, time-restricted, or a handicapped parking spot, among other types of parking spots. In some cases, the tracker 140 can determine or detect the vehicle parked in other locations within the parking facility that is not a parking spot. For example, the vehicle may be parked next to the fire hydrant, in a restricted zone, or at a loading dock.

The tracker 140 can determine that the vehicle is parked in the spot in response to the vehicle arriving in the parking spot (or other indicated or highlighted spaces within the facility). For example, the tracker 140 can compare or match the entry time captured by at least one camera 112 at the access point and the time of detection on one or more overview cameras 112. By comparing or matching the timestamps of the images, the tracker 140 can identify that a vehicle captured in at least one image of a first camera 112 is the same as the vehicle captured in at least one image of a second camera 112. Hence, the tracker 140 can match the timestamps of images to track the movement of the vehicle throughout the facility and to one or more parking spots. The tracker 140 can keep track of the location of the vehicle and the associated identification number associated with the vehicle.

In some cases, the tracker 140 can match one or more features of the vehicle from one image to other images. The tracker 140 can match the one or more features alone or in combination with timestamps of the images. The types of features used to match between image frames can include at least one of color, make, model, decal, or other identifiable or distinguishable features of the vehicle.

In some cases, the tracker 140 can determine that the vehicle is parked based on the duration of the vehicle in the parking spot, such as 15 seconds, 30 seconds, etc. In some cases, the tracker 140 can determine that the vehicle is parked based on the duration the vehicle is not moving. In some other cases, the tracker 140 performing image processing technique can determine that the vehicle is parked upon the client (e.g., the driver) exiting the vehicle. In response to determining that the vehicle is parked, the tracker 140 can transmit data associated with the vehicle to the event generator 144. The tracker 140 can transmit other data associated with the vehicle captured by the cameras 112 within the facility. By using at least AI-based video analytics or other image processing techniques, the tracker 140 can allow object detection-based triggering (as well as the feature extractor 136). Hence, the tracker 140 can track and monitor the vehicle locations within the facility, which allows barrierless or gateless operation for managing the facility.

In some cases, the tracker 140 can determine that the vehicle is not parking based on any movement of the vehicle. In another example, the tracker 140 may identify the vehicle as not parking in predetermined parking slots. The tracker 140 can transmit data of the vehicle activities in the facility to the event generator 144 to determine whether the event is a parking event, a non-parking event, or any violation event within the facility. In some cases, the tracker 140 can track a vehicle moving from one parking spot to another parking spot within the same or different facilities. Accordingly, the tracker 140 can provide real-time tracking of vehicles within the facility, thereby increasing the accuracy of locating the vehicles, and improving the reliability of the activities performed by the vehicles.

The event generator 144 can log or generate events associated with vehicles entered or accessing the facility. The event generator 144 can generate events associated with vehicles exiting the facility. For example, the event generator 144 can generate an event of the vehicle performing an activity in the facility, such as moving to enter, moving, or exiting the facility. The event generator 144 can generate an event of the vehicle parking within the facility. The generated individual events can include information or data associated with the vehicular activity. For example, by occupying a parking spot, the event generator 144 can generate an event for the vehicle including at least an image of the vehicle, the identification number of the vehicle, and a timestamp corresponding to the occupation of the parking spot. The image of the vehicle can include a parking image or other images of the vehicle traversing from the access point to the parking spot. The event generator 144 can log other data associated with the vehicle at the timestamp when the vehicle parked at the slot, for example. In this example, the other data may include the one or more features of the vehicle.

The event generator 144 can establish or initiate a timer for querying a transaction processing system 128. The timer can include a predetermined time threshold or countdown. Responsive to the expiration of the timer, the event generator 144 can query the transaction processing system 128. The event generator 144 can establish the timer based on at least one of the timestamps at which the vehicle enters the facility or a timestamp corresponding to the occupation of a parking slot by the vehicle. In some cases, the event generator 144 can establish the timer subsequent to a predetermined duration of the vehicle parked in the facility. In some other cases, the event generator 144 can establish the timer subsequent to a predetermined time period after the vehicle stopped within the facility, such as 1 minute, 2 minutes, 5 minutes, etc.

The event generator 144 can query the transaction processing system 128 in response to the expiration of the established timer. In some cases, the event generator 144 can query the transaction processing system 128 in response to the vehicle parked within a parking slot without establishing a timer. For example, the event generator 144 can identify or determine whether the client of the vehicle has already provided the transaction (e.g., pre-paid) to park in the facility. In this case, the event generator 144 may not establish a timer upon determining that the client has already completed the transaction.

In some cases, the client of the vehicle can complete a transaction for a time duration to park the vehicle, such as to start a countdown for the allowable parking duration. In this case, the activation device 116 or the client device 120 can include features or functionalities of a parking meter. To increase the duration of the parking, the client can complete a second transaction, etc. In this case, the event generator 144 can establish a first timer to query the transaction processing system 128 and a second timer upon expiration of the countdown, where the countdown is based on the policy of the facility and the transaction information from the transaction processing system 128. For example, the policy can indicate the transaction amount corresponding to the time increase for the countdown timer, such as 25 cents for 15 minutes.

In some cases, the event generator 144 can establish a different timer based on the type of parking slot or based on the policy of the facility. For example, the event generator 144 can establish a first timer for a parking spot accessible to any vehicle. The event generator 144 can establish a second timer for a handicapped parking spot, where the second timer can include a higher duration than the first timer. In another example, the event generator 144 can establish a third timer for a reserved parking spot or an exclusive parking spot, which may be of shorter duration than the first timer. The timer, which can be referred to as a grace period, can be set by the administrator of the DPS 102 or the facility operator, for example. The timer can provide a time period for clients of the respective vehicles to complete the transaction on the activation device 116 or the client device 120, such as to parking the vehicle in the facility.

In some cases, the event generator 144 can transmit the parking event to a remote computing device. In this case, the event generator 144 can delegate a portion of the tasks to the remote computing device to process the parking event data. In some cases, the event generator 144 can transmit vehicle information from the feature extractor 136 or the tracker 140 and the parking information generated by the event generator 144 to at least one of the facility device 108 or the enforcement device 124. In this case, the event generator 144 can transmit the information to other authorized devices within the network 104 upon request from the respective devices. For example, the event generator 144 can transmit the information to the enforcement device 124 for the enforcement officer to review the parking events or at least a portion of the facility status. The facility status can include, but is not limited to, the number of vehicles accessing the facility, the number of parking spaces available, number of parking spaces occupied, etc.

The event generator 144 can query, using the identification number of the vehicle, the transaction processing system 128 in response to an expiration of the timer. The event generator 144 can query the transaction processing system 128 via an API connection. The API connection can enable the DPS 102 to communicate with at least the transaction processing system 128 for all transaction solutions, such as transactions from the activation device 116 or the client device 120. In this case, the transaction processing system 128 can communicate with at least the activation device 116 or the client device 120 for receiving the transactions. The event generator 144 can query the transaction processing system 128 for transaction information associate with the identification number of the vehicle. The event generator 144 can query the transaction processing system 128 upon expiration of the timer for any other respective vehicles using the identification number as the query.

In response to querying the transaction processing system 128, the event generator 144 can receive transaction information of the vehicle associated with the identification number used for the query. The transaction information can include at least the transaction status, duration of parking, remaining duration of parking until expiration until a countdown expires, or duration since the transaction status. The transaction status can include an indication of whether the payment is completed for parking in the facility, which can include a completed transaction status or an incomplete transaction status. Completed transaction status can be when the client of the vehicle having the identification number completed payment for parking in the facility. Incomplete transaction status can be when the client has not paid or paid an insufficient amount for parking in the facility.

The event generator 144 can obtain all transaction solutions by querying the transaction processing system 128, which receives transaction information from at least the activation device 116 or the client device 120. In some cases, the event generator 144 can query the transaction solutions directly for transaction information. In this case, the event generator 144 can query at least the activation device 116 or the client device 120, where the client device 120 can include a local kiosk of the facility. In response to receiving transaction information via the API connection, the event generator 144 can determine whether there is a parking violation.

The event generator 144 can generate a violation event for any vehicle that violated the policy of the facility. For example, the event generator 144 can generate a violation event for a vehicle based on the transaction information received responsive to the query and the parking event. The transaction information can indicate that the transaction is incomplete for the vehicle. Accordingly, the event generator 144 can generate a violation event for the vehicle using the identification number of the vehicle. In this example, the policy can indicate for the client to complete a transaction within the timer.

In another example, the policy can indicate no parking in restricted areas. The restricted areas can be marked in the facility and indicated on the map of the facility. Further, the facility operator can provide an indication of the restricted areas to the DPS 102. Areas near the fire hydrant can be considered as restricted areas. Further, the loading dock of the facility can be a restricted area. In this example, the event generator 144 can generate a violation event for vehicles parking or accessing the restricted areas based on the policy. For example, the event generator 144 can generate the violation event upon the vehicle parking in the restricted area. In another example, the event generator 144 can generate the violation event upon the vehicle parking in the restricted area for a predetermined duration, such as 5 minutes, 10 minutes, etc.

In some cases, the restricted areas can be accessed by certain vehicles authorized to access the one or more areas. The event generator 144 can determine that the vehicle is authorized based on a listing of authorized vehicles stored in the database 156. The event generator 144 may not generate a violation event for authorized vehicles. The event generator 144 can generate a violation event for vehicles not authorized to access the restricted areas.

The event generator 144 can store all violation events within the database 156. The individual violation events can include at least the vehicle entry time, transaction information, identification number, and one or more images of the vehicle that incurred the violation. The event generator 144 can provide other information as part of the violation event. In some cases, the event generator 144 can store the violation event in association with the identification number registered in the database 156. In this case, the event generator 144 can access information associated with a respective identification number to determine whether the vehicle has any parking violation.

In some cases, the event generator 144 can establish a timer to generate a violation event instead of querying to the transaction processing system 128. For example, the event generator 144 can determine or identify that a vehicle is parked in a restricted zone (without authorization or access based on the identification number), outside of the predetermined parking spots, or parked next to a fire hydrant. In this case, upon identifying the areas within the facility restricted from parking, the event generator 144 can generate a violation event for the vehicle accordingly.

In some cases, the event generator 144 may not establish a timer for a vehicle. For example, the event generator 144 can determine that the identification number of the vehicle is included in an exclusion list. The exclusion list can be a list of identification numbers authorized to access the facility without providing transaction information. For example, the client of the vehicle associated with a listed identification number may have completed a transaction for a monthly, yearly, or seasonal pass to the facility. The exclusion list can include identification numbers of the enforcement officer's vehicle or the facility operator's vehicle, for example. The exclusion list can be updated or modified by the facility operator or by completing transaction information within an application provided by the DPS 102.

For example, the event generator 144 can perform a lookup in the database 156 upon identifying the identification number of the vehicle. The event generator 144 can perform the lookup in an exclusion list. The event generator 144 can determine that the vehicle is exempt from the transaction processing based on the identification number of the vehicle included in the list. Accordingly, the event generator 144 may not establish or disable a timer for the vehicle. In some cases, if the timer has already been established, the event generator 144 can disable the timer for the vehicle responsive to the determination that the vehicle is exempt from the transaction processing. Transaction processing can refer to the process of completing the transaction with the transaction processing system 128 using the activation device 116 or the client device 120.

In some cases, the event generator 144 may not establish a timer for a vehicle that is not parking in the facility. For example, the tracker 140 can identify a vehicle entering and exiting the facility without parking. In this case, the event generator 144 can determine that the vehicle is not occupying a space in the facility, thereby not starting a timer for the respective vehicle. In some cases, the event generator 144 can determine that the vehicle is temporarily parking in the facility for a short time, such as within the established timer duration. In this case, the event generator 144 may not generate a violation event for the vehicle that either exits or move to a different location within the established timer. In some other cases, the event generator 144 can determine that the vehicle is temporarily parking in the facility to perform a quick task. For example, the vehicle can stop in the facility to drop off packages, pick up passengers, or deliver food. In this case, the event generator 144 may not establish a timer for the respective vehicle.

In some cases, the event generator 144 can remove a violation event based on a completed transaction for the vehicle. In this case, the transaction may be completed subsequent to the event generator 144 generating the violation event for the respective vehicle but before an enforcement officer marked the vehicle. The event generator 144 can remove the violation event upon the client completing a second transaction issued by an enforcement officer, such as completing a transaction for a parking ticket. The event generator 144 may remove a violation event upon an administrator, facility operator, or enforcement officer manually removing or indicating to the event generator 144 to remove the violation event. The event generator 144 can remove the violation event based on the identification number of the vehicle being included in an exclusion event, for example.

The event generator 144 can assign the violation event to the identification number of the vehicle upon incurring the violation. The event generator 144 can assign the violation event of the vehicle to the parking spot for the vehicle. The event generator 144 can include the location of the vehicle or the parking slot of the vehicle in the violation event. The event generator 144 can determine the location or the parking spot based on the data from the cameras 112. For example, the event generator 144 can assign violation events to various vehicles in at least a subset of various parking spots with violations.

The event generator 144 can generate a status or an overview of the facility. For example, the event generator 144 can provide the total number of vehicles within the facility based on the data from the camera 112, the location of individual vehicles within the facility, the transaction data associated with respective identification numbers of the vehicles, etc. The event generator 144 can provide the status of the facility to at least one of the facility device 108 or the enforcement device 124.

In some cases, the transaction processing system 128 can request or access information associated with the identification number of the vehicle. The transaction processing system 128 can access information associated with the vehicle from a contracting service provider or the Department of Motor Vehicles ("DMV"). The contracting service provider can provide access to the vehicle owner data or other information associated with the identification number. For example, the event generator 144 can query the transaction status of a respective vehicle to the transaction processing system 128 with the identification number. In this example, the event generator 144 can query the transaction status from the transaction processing system 128 in response to the vehicle exiting the facility. In this case, the transaction processing system 128 can identify at least an email or contact information associated with the identification number. Based on the payment status, the transaction processing system 128 can transmit a quote or a request to the client of the vehicle to complete a transaction for using the facility. Subsequent to generating the violation event, the event generator 144 can relay or forward the generated violation event to the event classifier 148 for classification of the event. In some other cases, the DPS 102 can request or access information associated with the identification number of the vehicle. The enforcement device 124 can communicate with the DMV to perform a look-up of information associated with the vehicle identification number. The enforcement device 124 can perform the look-up to generate a citation for any violation of the vehicle.

The event generator 144 can identify or determine that the vehicle is circling or traveling inside the facility without parking in a slot. In some cases, the event generator 144 may initiate a timer in response to the vehicle entering the facility and continue the timer until expiration even when the vehicle is not parked. In some other cases, the event generator 144 may initiate a timer in response to the vehicle parking in a slot. In this case, the vehicle can visit the facility without triggering the timer unless parked in at least one of the slots or certain predetermined areas. The predetermined areas can include a restricted zone, sidewalk, etc.

In some cases, the event generator 144 can initiate multiple timers. For example, the event generator 144 can initiate a first timer as a grace period for visitors to visit the facility, such as 15 minutes, 30 minutes, etc. Upon expiration of the first timer, the event generator 144 can initiate a second timer similar to the timer for parked vehicles. Hence, the event generator 144 can generate a violation event in response to the expiration of the second timer. The event generator 144 can generate a violation event without generating a parking event for the vehicle. Instead, in this example, the event generator 144 can generate a visitor event including at least one of the identification number, features of the vehicle, length of time within the facility, locations, and in some cases, the velocity of the vehicle. Initiating multiple timers can include blocking the first timer and restarting the first timer or initiating the second timer, for example. Accordingly, the event generator 144 (or the event classifier 148 after classifying the generated events) can alert the enforcement device 124 of the new violations, without providing too many alarms or erroneous alarms for visiting vehicles. Further, since events are generated in response to real-time activities captured by the cameras 112 and based on the timer, the event generator 144 can improve the accuracy and reliability of the alerts sent to the enforcement device 124.

The event classifier 148 can classify the violation event generated by the event generator 144. The event classifier 148 can classify the violation event based on at least one of the timestamp at which the vehicle enters the facility, the parking event, or the transaction information. The violation event can be classified with different classifications of parking violations, such as an incomplete transaction violation (e.g., insufficient transaction or non-paid parking), location violation (e.g., parking at a restricted zone or reserved area), handicapped violation (e.g., parking in a handicapped spot), among others. For example, the event classifier 148 can classify the violation event as an incomplete transaction based on an absence of transaction information responsive to an expiration of the established timer. The event classifier 148 can classify the violation event as a location violation based on the vehicle parked in a restricted zone for a predetermined duration.

In further example, the event classifier 148 can classify other violation events based on the information provided in the generated violation events matching at least one of the policies stored in the database 156. For example, the event classifier 148 can identify the duration indicated in the policy for a violation event to be considered as an incomplete transaction violation. The event classifier 148 can compare the identified duration with the parking duration of the vehicle that has not completed the transaction. Accordingly, the event classifier 148 can classify the violation event based on the policy, such as the parking duration until a classification. The event classifier 148 can classify the violation events as other types of classifications based on the policy configured by the administrator.

The event classifier 148 can provide graphical content, icons, or other user interfaces to one or more devices within the network 104, such as the enforcement device 124. For example, responsive to receiving a request from the enforcement device 124, the event classifier 148 can provide information stored in the parking event for display on the enforcement device 124. The information can be displayed via an application installed on the enforcement device 124, where the event classifier 148 can communicate the parking event information via an API connection. The application can be a local application or a web application. In this case, the event classifier 148 can receive the request in response to the enforcement device 124 launching the application. The user interface displayed on the enforcement device 124 can include a digital map of at least the facility or areas including various facilities. The user interface can include various parking spots of the facility in the digital map.

The event classifier 148 can overlay at least an icon or graphical content on the digital map of the application. The event classifier 148 can overlay the icon on a parking spot occupied by the vehicle with a violation. The event classifier 148 can overlay the icon representing or indicating the classification of the violation event at the parking spot location of the facility map. The event classifier 148 can overlay or provide different icons or graphical content based on the types of classifications for the violation events.

In some cases, the event classifier 148 can classify the violation event based on a duration of ticket expiration or an absence of transaction information. For example, the event classifier 148 can receive a violation event from the event generator 144 indicating the duration since the ticket expired or that the client has not completed a transaction for the ticket. Accordingly, the event classifier 148 can update the digital map of the parking facility with an icon at the parking spot associated with the vehicle in violation of the policy. The event classifier 148 can update the digital map displayed on the enforcement device 124 in real-time or be responsive to new events based on the data streamed from the one or more cameras 112. For example, the event classifier 148 can update the digital map with new icons or removed icons in response to receiving data from the cameras 112 and determining a current event by at least the feature extractor 136, the tracker 140, the event generator 144, or the event classifier 148. In some cases, the event classifier 148 can provide the digital map for display on other devices of the network 104, such as the facility device 108.

The event classifier 148 can receive an indication that the violation event has been marked. For example, subsequent to providing the digital map with icons indicating the parking spot of the vehicle with the violation, an enforcement officer can navigate to the parking spot. The enforcement officer can mark the vehicle, such as issuing a parking ticket. The enforcement officer can use the enforcement device 124 to mark the parking spot, indicating that the vehicle has been marked or a ticket has been provided. In this case, the event classifier 148 can update the icon overlaid on the digital map at the parking spot. The event classifier 148 can update the icon to indicate that the violation event at the parking spot has been marked.

In some cases, the event classifier 148 can remove an icon indicating the violation event at a parking spot. For example, the event classifier 148 can remove the icon in response to the vehicle exiting the parking spot. The event classifier 148 can update the digital map by adding the icon in a different parking spot if the vehicle exiting the parking spot transitioned to the different parking spot. Hence, the event classifier 148 can maintain the icon or classification of the violation event with the vehicle. Any update to the icons, the digital map, or other graphical content can be updated on the enforcement device 124 to display for the enforcement officer.

The event classifier 148 can classify the violation events assigned to or determined for various vehicles in at least a subset of parking spots of the facility. The event classifier 148 can provide a digital map for display on at least the enforcement device 124 overlaid with various icons indicating the classification of individual violation events. The event classifier 148 can overlay the icons at the parking spots associated with the vehicles with the violations. The event classifier 148 can generate or provide different icons based on the classification of the violation events.

The event classifier 148 can classify the violation events into different rankings. For example, the event classifier 148 can rank parking spots occupied by the vehicles with the assigned violation events violations based on the classification of the respective violation events. The rank can include or represent the severity or the duration of the violation.

For example, the event classifier 148 can rank the violation from 1 to 5 for different types of classification or duration of unresolved violation events. In the case of the types of classification, the event classifier 148 can rank incomplete transaction events as a lower rank (e.g., 1/5), parking in restricted areas as a medium rank (e.g., 3/5) based on the location of the restricted area, and unauthorized parking in handicapped slots as medium-high rank (e.g., 4/5). The event classifier 148 can adjust the ranking based on the policies provided in the database 156. In some cases, the event classifier 148 can rank the violation event based on obstruction to traffic, such as whether the parked location hinders at least one other vehicle from moving within the facility or whether the parked slot is for another authorized vehicle. In this case, the event classifier 148 can increase the ranking of the violation event.

In another example, the event classifier 148 can increase the ranking based on the duration of unresolved violation events or classification. For example, the event classifier 148 can determine that the client of a vehicle has not completed the transaction for parking for a duration from the generation of a ticket, entrance into the facility, or parking in the parking slot (including other parking slots). If the duration is a first predetermined duration (e.g., 20 minutes), the event classifier 148 can rank the violation event as a low rank, such as 1/5. If the duration is a second predetermined duration (e.g., 1 hour), the event classifier 148 can rank the violation as a low-medium rank. For a third predetermined duration (e.g., 2 hours), the event classifier 148 can rank the violation as a medium rank, such as 3/5, etc. The event classifier 148 can use other types of ranking systems. For example, the ranking can represent the severity of the parking ticket which will be issued by the enforcement officer. Accordingly, with the visual interface including the icons or other graphical content, the event classifier 148 can enable the facility operator or enforcement officer to oversee the operations in real-time by viewing parking event information, violation event information, and other parking statistics.

The route generator 152 can generate a route to traverse the facility for marking various vehicles associated with one or more violation events. The route generator 152 can generate the route for the enforcement officer using the enforcement device 124 to navigate to various parking spots associated with the violation events. The route generator 152 can generate the route based on at least one of the ranks of the violation events, the location of individual parking spots, or the distance between individual parking spots in the facility. The route generator 152 can use any type of path calculation algorithm, such as Dijkstra's algorithm, Bellman-Ford algorithm, or other types of shortest path algorithms.

In some cases, the route generator 152 can generate the route based on a combination of the ranking, the location, or the distance of the parking spots. For example, a first parking spot can be assigned a rank of 3/5 with a distance of 10 meters from the enforcement device 124, a second parking spot can be assigned with a 5/5 rank with a distance of 15 meters from the enforcement device 124, and a third parking spot can be assigned with a 1/5 rank with a distance of 16 meters from the enforcement device 124. In this case, based on both the ranking and the location or distance, the route generator 152 can generate a route to the second parking spot, the third parking spot, and subsequently the first parking spot. The route generator 152 can provide a route or a navigation path to the enforcement device 124 for display. The route can be overlaid on the digital map with icons associated with the violation events.

In some cases, the enforcement device 124 can be used to monitor multiple facilities. Similar to calculating the route for navigating to different parking spots, the route generator 152 can calculate the route to different facilities. For example, the route generator 152 can generate a route for navigating to different facilities based on the location of the facilities. In this example, the route generator 152 can identify the shortest path to individual facilities. The route generator 152 can generate a route with the shortest path to each facility. In another example, the route generator 152 can generate a route based on the ranking of each facility. In this example, the event classifier 148 can aggregate the rankings assigned to parking spots within the facility, such as determining the sum, average, median, or other aggregation techniques. In some cases, the event classifier 148 can add the total number of vehicles with violations to determine the ranking. Accordingly, the route generator 152 can calculate a route from the highest-ranking to the lowest ranking facility. In some other cases, the route generator 152 can calculate the route based on a combination of the location of the facilities and the ranking of individual facilities.

In some cases, route generator 152 can re-calculate the route in response to receiving an update to events or classification of events from at least the event generator 144 or the event classifier 148. For example, a violation can be removed, added, or updated in ranking. The route generator 152 can re-generate at least a portion of the route respective to the update and transmit the updated route to the enforcement device 124. Further, if a parking spot has been marked, the route generator 152 can remove the route proceeding to or emerging from the marked parking spot. If the marked spot is in between un-marked parking slots, the route generator 152 can hop from the previous parking spot to the next un-marked parking slot as in the calculated route.

Accordingly, the components (e.g., interface 132, feature extractor 136, tracker 140, event generator 144, event classifier 148, or the route generator 152) of the DPS 102 can execute individually or concurrent with each other to provide automation of vehicle registration. The DPS 102 can enable high-level parking enforcement automation to oversee parking operations in real-time, such as by updating the digital map responsive to new data from the camera 112. Further, by providing real-time operation monitoring features, the DPS 102 can provide high-accuracy facility statistics and automatic route planning for enforcement officers to efficiently mark vehicles assigned with violation events. The DPS 102 can provide 24/7 or around-the-clock monitoring of any facility in communication with the DPS 102. Thus, the DPS 102 can at least improve the efficiency and reduce time consumption for marking vehicles using the generated route, and mitigate incomplete transactions of parked vehicles without affecting ingress or egress times.

The database 156 can include or be referred to as a data storage, data repository, memory, or storage device. The database 156 can include a map storage 160, graphical content storage 164, route storage 168, and policy storage 172. The database 156 can store any information as discussed hereinabove. The database 156 can be accessed by one or more components (e.g., feature extractor 136, tracker 140, event generator 144, event classifier 148, or route generator 152) of the DPS 102. The component of the DPS 102 can access the database 156 to store or retrieve data, such as storing processed data or retrieve data for processing.

In some cases, the database 156 can be accessed by at least one component (e.g., facility device 108, activation device 116, client device 120, enforcement device 124, or transaction processing system 128) of the system 100. For example, the database 156 can be accessed by the facility device 108 or a device of the facility operator to update or retrieve information from the database 156 including at least the policies, the map, or the graphical content. In another example, the facility device 108 (or the camera 112) can transmit data for storage in the database 156, such as images or videos. In further example, the enforcement device 124 can retrieve data from the database 156, such as the map and graphical content for navigating in the facilities.

The map storage 160 can include, store, or maintain a map including one or more facilities within at least one region. The one or more facilities can be equipped with devices or components in communication with the DPS 102, such as a facility device 108 or one or more cameras 112. The facilities can be managed by a single entity or different entities. The map storage 160 can include the map of each facility, such as the layout, parking slot locations, access point location, among other features of the facility. The map storage 160 can store or maintain a map that the DPS 102 downloaded from a remote server or a remote computing device of the network 104. In some cases, the facility operator can preconfigure the map and transmit the map to the DPS 102 for storage in the map storage 160. For example, the facility operator can use the facility device 108 to update or preconfigure the layout of the facility and transmit an update or the preconfigured facility layout to the DPS 102. The map storage 160 can store various maps that can be updated in real-time by the one or more components (e.g., feature extractor 136, tracker 140, event generator 144, event classifier 148, or route generator 152) of the DPS 102.

The map storage 160 can store an overlay for the one or more maps. The overlay can be an additional layer of the map, including one or more icons or graphical content indicating at least an event or object located in the map. The map storage 160 can include multiple overlays for the map. For example, the map storage 160 can include a first overlay including graphical content representing the vehicle within the parking facility. The map storage 160 can include a second overlay including icons representing at least the parking events or violation events of the respective vehicles in the parking slots. The map storage 160 can include a third overlay including a route for navigating from one violation event to another. The route can be displayed on a display device of the enforcement device 124 used by the enforcement officer to navigate within the facility or to other facilities. In some cases, the map storage 160 can include a single layer of overlay for the map for displaying all icons, graphical content, or route.

The graphical content storage 164 can include, store, or maintain any visual representations of objects or events in or overlayed on the map. For example, the graphical content storage 164 can store graphical content, icons, images, or otherwise symbols for illustration on the map stored in the map storage 160. The graphical content can include icons of a vehicle, icons representing different types of classification of violation events, icons representing parking events, icons for the locations of the cameras within a respective facility, symbols representing types of parking slots (e.g., handicapped slot or reserved slot), an outline of parking slots within the facility, icon representing a parking slot (or vehicle) associated with at least one violation event is marked, etc. In some cases, the graphical content storage 164 can store graphical illustrations of the route to be overlayed on the map.

The route storage 168 can include, store, or maintain information associated with the generated route by the route generator 152. The route storage 168 can store various routes for the enforcement officer to navigate within a facility or to other facilities. The route storage 168 can receive data from the route generator 152 to update, replace, or add a route. The route storage 168 can store multiple alternative routes, which can be selected by the enforcement officer. The alternative routes can be based at least on one of the locations of each violation event, the ranking of each violation, among other navigation priorities for calculation of the route.

The policy storage 172 can include, store, or maintain one or more policies of the parking facility. For example, the policy storage 172 can store or include at least parking rules, violation lists, grace period (e.g., a predetermined timer duration for individual parking slots), a list of exempt identification numbers, entrance fee, fee for increasing countdown timer (e.g., parking meter), or parking duration for individual parking slots. The policy can be modified, configured, removed, or added by the facility operator. The policy can be different for each facility. The stored policies can be used by the event generator 144 to generate the violation events. The stored policies can be used by the event classifier 148 to classify or rank the violation events. The enforcement officer can refer to the policies for marking a vehicle at a parking slot associated with at least one violation event.

Further, the database 156 can store other data as discussed hereinabove. For example, the database 156 can store the images, videos, various event information associated with each facility, or the map of the facility. Further, the database 156 can store any facility information, status, or statistic, transaction information, ticket information, vehicle identification number, a hash table, transaction information, graphical content, violations, among other relevant information related to facilities, vehicles, or events. The hash table can include the identification number of individual vehicles. The identification number of each vehicle can be associated with at least parking event information, violation event information, or ticket information. Further, the hash table can associate the identification number to features, images, or other vehicular information of the respective vehicle. The database 156 can store the types of classifications that can be used by the event classifier 148 to classify a violation event. The database 156 can store types of parking events, which can be used by the event generator 144 to generate different types of parking events, such as a vehicle occupying or exiting a parking slot.

Figure 2:
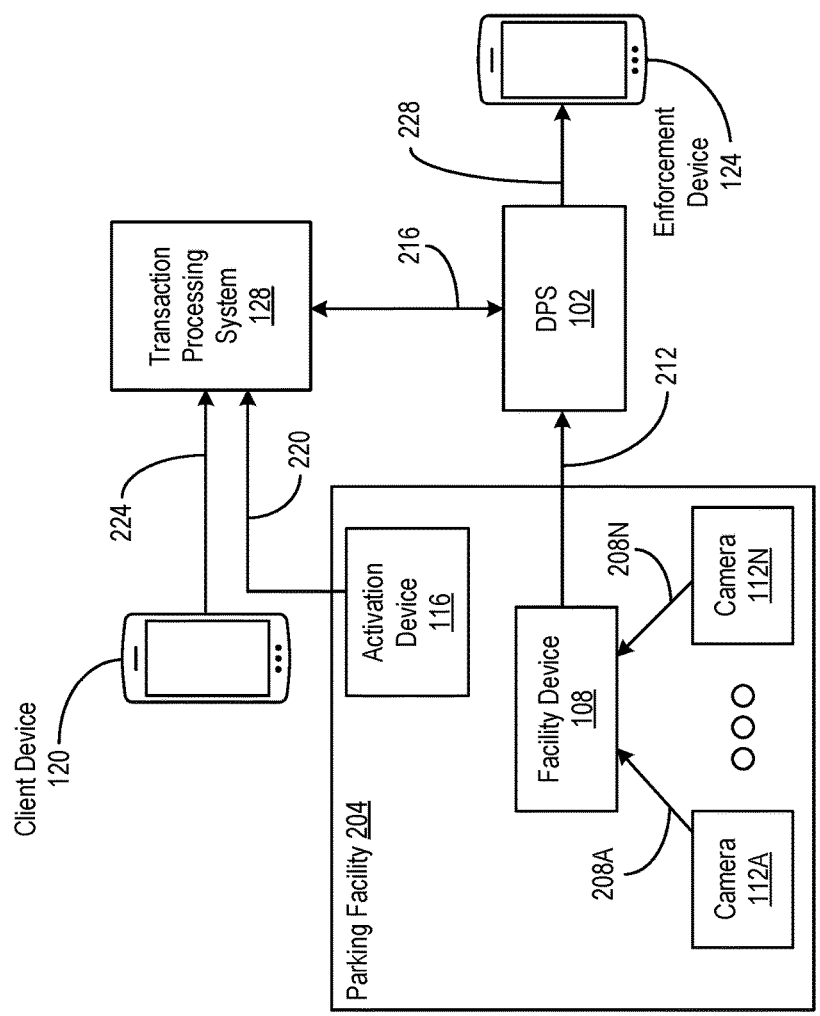
FIG. 2 is an example operational diagram illustrating a data transmission to an enforcement device for real-time parking operation monitoring, in accordance with an implementation.

Referring now to FIG. 2, an example operational diagram 200 illustrating a data transmission to an enforcement device for real-time parking operation monitoring is shown, in accordance with some implementations. The diagram 200 can include one or more components or functionality of system 100 depicted in FIG. 1. The diagram 200 can include at least one DPS 102, at least one facility device 108, one or more cameras 112A-N (sometimes referred to generally as camera(s) 112) at least one activation device 116, at least one client device 120, at least one enforcement device 124, and at least one transaction processing system 128. The components or devices (e.g., DPS 102, facility device 108, activation device 116, client device 120, enforcement device 124, or transaction processing system 128) in diagram 200 can communicate with other components or devices via a network 104, such as in conjunction with FIG. 1.

The diagram 200 can include a parking facility 204. The parking facility 204 can include at least the facility device 108, one or more cameras 112, and an activation device 116 located locally in the parking facility 204. Other parking facilities 204 can include similar components. The local devices within the parking facility 204 can communicate with other devices remote from the facility, such as the DPS 102, the transaction processing system 128, or the enforcement device 124. The DPS 102 can be located remote from the parking facility 204. In some cases, the DPS 102 can be located locally to the parking facility 204. The diagram 200 can illustrate example steps for providing information to the enforcement device 124.

The cameras 112 can transmit image data or video data to the facility device 108 (ACT 208A-N). In some cases, the cameras 112 can transmit data directly to the DPS 102. Data can include image frames or videos of the parking facility 204. The cameras 112 can be included or installed in the parking facility 204. The cameras 112 can be implemented without a hardware trigger, such as no trigger to initiate capturing data. In this case, the cameras 112 can continuously transmit data to the facility device 108 or the DPS 102. For example, the cameras 112 can be connected to a recognition unit, such as an image recognition software installed on the facility device 108 or performed on the DPS 102. Upon detection of an object, such as a vehicle from the image frames sent from the cameras 112, the DPS 102 can initiate a license plate recognition process to identify the identification number of the vehicle. In some cases, the cameras 112 can be implemented with a hardware trigger. For example, the cameras 112 can start capturing images to the facility device 108 upon an object detection hardware trigger.

The facility device 108 can receive data from the cameras 112 and forward the data to the DPS 102 (ACT 212). In some cases, the DPS 102 can receive data directly from the cameras 112. The facility device 108 can be a device local to the parking facility 204, such as a local computing device in a facility control room. For example, the facility device 108 can include one or more display devices for monitoring image frames captured by the cameras 112 of the parking facility 204, such as for security purposes or parking management. The facility device 108 can be operated or used by the facility operator or an administrator of the facility. In some cases, the facility device 108 can be an intermediary device to forward data from the cameras 112 to the DPS 102.

The DPS 102 can receive captured data from the cameras 112, such as via the facility device 108. The DPS 102 can process the data using one or more image processing techniques. The DPS 102 can process the data to extract at least one or more features of vehicles entering into the parking facility 204, locations of the vehicles, number of vehicles, occupancy of the parking slots, identification number of the vehicles, among other features discussed herein. The DPS 102 can use footage from the cameras 112 to track vehicles throughout the parking facility 204. The DPS 102 can generate events details based on the camera footage, such as parking events or violation events.

The activation device 116 can transmit ticket information to the transaction processing system 128. For example, upon a vehicle arriving at the parking facility 204, the client of the vehicle can request a ticket from the activation device 116. The activation device 116 can provide a ticket having ticket information. The ticket information can be stored locally in the activation device 116, on the transaction processing system 128 upon sending the ticket information, or on the DPS 102. At least a portion of the ticket information can be printed on the ticket. In some cases, the ticket can be a digital ticket sent to an application installed on the client device 120 (e.g., a device of the client in this case). The ticket information can include at least entry time, transaction due (e.g., parking fees), among other information for parking within the parking facility 204. In some cases, the ticket information can include the identification number of the vehicle captured and processed by the DPS 102.

The activation device 116 can transmit transaction information to the transaction processing system 128 (ACT 220). The transaction information can include transactions received from the client for a ticket or parking within the parking facility 204. The transaction information can include at least an identification number, time of the transaction, transaction amount, transaction method (e.g., credit, debit, cash, etc.), etc. In some cases, the transaction information can include transaction status, such as whether the transaction is completed or incomplete. For example, the client can identify the identification number of a vehicle to initiate a transaction. The activation device 116 can transmit the identification number to the DPS 102 or the transaction processing system 128. The DPS 102 can determine whether the identification number is registered within the database 156. If the identification number is registered, the DPS 102 can calculate a transaction amount that should be provided to the transaction processing system 128. In some cases, if an identification number is not listed in the database 156 (or data storage of the transaction processing system 128), the DPS 102 can inform the client of the invalid identification number via a display of the activation device 116. Accordingly, based on the indicated transaction amount, the client can provide transaction information (e.g., payment information) to the transaction processing system to complete the transaction.

The DPS 102 (or the transaction processing system 128) can determine whether the client completed the transaction. For example, the DPS 102 can compare the transaction amount provided to the transaction amount due. If the transaction amount provided is equal to or greater than the amount due, the DPS 102 can determine or change the transaction status as completed. Otherwise, the DPS 102 can determine or maintain the transaction status as incomplete, such as if the transaction amount is not provided or less than the amount due. The data provided from the activation device 116 to the transaction processing system 128 can include or be referred to as parking transaction data.

The client device 120 can include features or functionalities of the activation device 116. In some cases, the client device 120 can be a part of the activation device 116, such as a kiosk located within the parking facility 204. The client can use the client device 120 to provide mobile transactions (e.g., transaction information) to the transaction processing system 128 (ACT 224). The client device 120 can be used to complete a transaction, such as to pay for accessing the parking facility 204 or parking in a slot within the parking facility 204. The client device 120 can include or be installed with an application to complete a transaction with the transaction processing system 128.

The transaction processing system 128 can receive transaction information from at least the activation device 116 or the client device 120. The transaction processing system 128 can include features or functionalities or be a part of a transaction solution (e.g., payment solution) configured to accept transactions from different devices. The transaction processing system 128 can process the transaction information, such as card information via an application or cash inserted into a physical machine. The transaction processing system 128 can acknowledge or deny the transaction based on the validity of the transaction information. The transaction processing system 128 can provide the transaction information from the client to one or more authorized devices (e.g., the DPS 102), including whether the transaction was successful or unsuccessful.

The DPS 102 can request and receive transaction information from the transaction processing system 128 via an API connection (ACT 216). The transaction information can be from any or all transaction solutions, such as from the activation device 116 or the client device 120 used to complete a transaction. For example, the DPS 102 can query the transaction processing system 128 for transaction information with the identification number of the respective vehicles. The DPS 102 can transmit the query responsive to an expiration of a timer or grace period configured to allow the client time to complete the transaction. The transaction processing system 128 can use the identification number to identify the associated transaction information, which can be stored on the transaction processing system 128 or a remote server.

From the received transaction information, the DPS 102 can generate any violation event for any vehicle within the parking facility 204. The DPS 102 can identify a parking slot associated with the vehicle based on their identification number, which the vehicle having the identification number can be tracked within the parking facility 204. The DPS 102 can assign a parking spot with a violation event associated with a vehicle incurred with a violation. The violation event can be represented with an icon or any graphical content. The DPS 102 can remove and assign the violation event to other parking spots to other vehicles with at least one violation. In some cases, the DPS 102 can track a vehicle with a violation moving from a first parking spot to a second parking slot. The DPS 102 can remove the violation event from the first parking spot and assign the violation event to the second parking spot. By generating the violation event and assigning the violation event to a parking slot, the DPS 102 can generate a route for display on an enforcement device 124.

The DPS 102 can transmit event data and at least one route to the enforcement device 124 (ACT 228). The event data can include at least parking events and violation events within the parking facility 204 (or other facilities managed by the DPS 102). For example, the DPS 102 can transmit data including at least the entry time, payment status, at least one violation event, identification number, and one or more images of the vehicle assigned with a violation to the enforcement device 124. The DPS 102 can transmit similar data to the enforcement device 124 for other vehicles assigned with one or more violations. The information can be displayed upon request by the enforcement officer, such as via interaction with an icon on the user interface. In this case, enforcement device 124 can display the information associated with each vehicle upon request, such as to prevent overloading information on the graphical user interface. For example, the enforcement officer can interact with an icon displayed on the enforcement device 124. The icon representing a violation event. Responsive to the interaction, the enforcement device 124 can display at least the reason for violation (e.g., timer expiration, exceed the parking time limit, etc.), entry time, transaction status, and at least one image of the vehicle, for example. The DPS 102 can provide other information based on the configuration by the administrator of the DPS 102 or the facility operator.

The DPS 102 can provide various graphical content to the enforcement device 124, such as icons representing events, vehicles, timers established when the vehicle parks, marked vehicles or parking slots, parking spots, cameras locations, etc. The icons can be overlayed on a map of the enforcement device. The map can include or be a part of a regional map (e.g., satellite map) or a facility map. The map can include any digital map either within an application connected to or managed by the administrator of the DPS 102 or the facility operator.

The DPS 102 can transmit the route to the enforcement device 124 for display as an overlay on a map. The route can include any navigation icons, such as arrows, lines, location markers, etc. The route can link or connect from an event to subsequent events, such as representing vectors or tracks connecting various points. The DPS 102 can generate the route based on at least the location of the violation events or the rank of the violation events. The DPS 102 can compute or generate the route using any path calculation algorithm. The DPS 102 can update the route in response to new or updated events generated based on data from the cameras 112. Accordingly, the DPS 102 can provide a map overlaid with icons and at least a route to provide enforcement officers with an enforcement tour plan for facilitating enforcement of parking violations.

Figure 3:
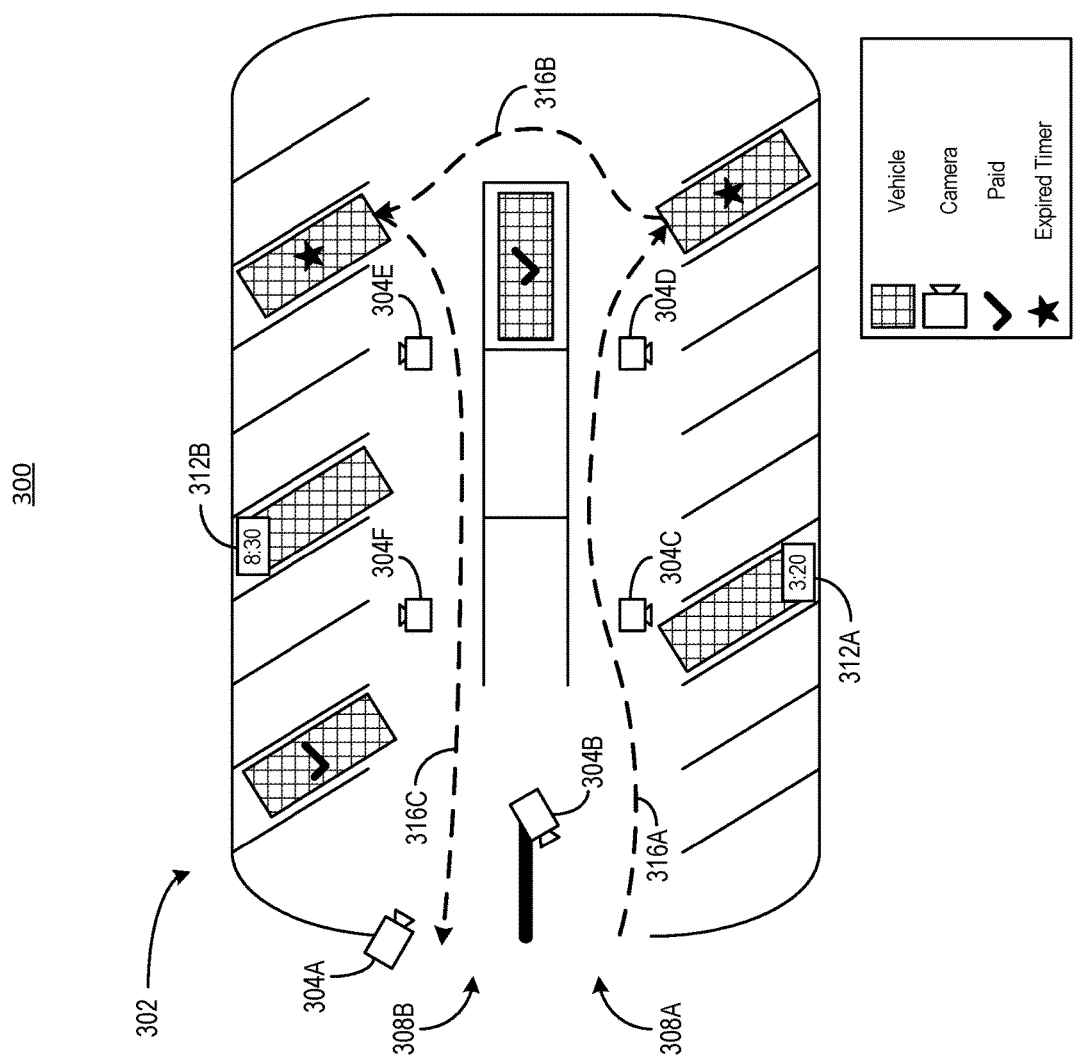
FIG. 3 is an example illustration of parking facility with graphical contents rendered on a user interface, in accordance with an implementation.

FIG. 3 is an example illustration 300 of a parking facility 302 with graphical contents rendered on a user interface, in accordance with an implementation. The illustration 300 can include one or more components or functionality depicted in FIGS. 1 and 2, including, for example, the DPS 102, the cameras 112, or the enforcement device 124. FIG. 3 can depict a top view of at least a portion of a parking facility 302. The parking facility 302 can include various parking slots for parking by one or more vehicles. The parking facility 302 can include various cameras, such as cameras 304A-F (sometimes referred to generally as camera(s) 304).

The cameras 304 can include features or functionalities of cameras 112. For example, the cameras 304 can transmit data to or communicate with a local device of the facility (e.g., facility device 108) or the DPS 102. The parking facility 302 can include an access point including an entrance 308A and an exit 308B. The parking facility 302 can include other floors or parking slots accessible through a ramp (not shown), for example. The parking facility 302 can include features or be a part of any parking facilities, such as parking facility 204.

The DPS 102 can track vehicles entering and traversing through the parking facility 302 using data from at least one of cameras 304A-F. In this case, camera 304B can be positioned at the entry of the parking facility 302, and camera 304A can be positioned at the exit of the parking facility 302. Cameras 304C-F can be positioned to provide an overview of at least one or more parking slots and the path through the facility. The DPS 102 can detect or determine features of the vehicle using the cameras 304. For example, the DPS 102 can identify and determine the identification number of vehicles using at least one of camera 304B or camera 304A. The DPS 102 can receive a front view image of the vehicle using data from camera 304B. The DPS 102 can receive a back view image of the vehicle from camera 304A. The front view or the back view image of the vehicle can include an identification number. The DPS 102 can track the vehicle moving through the parking facility 302 via the cameras 304 providing overlaying fields of view. For example, camera 304C can provide an overlaying field of view to at least camera 304B and camera 304D. Camera 304D can provide an overlaying field of view to at least camera 304C and camera 304E, etc.

The DPS 102 can register an identification number of a vehicle upon entry into the parking facility 302, such as via entrance 308A. In some cases, the DPS 102 can capture entry of a vehicle via the exit 308B. The DPS 102 can track the vehicle to a parking spot. The DPS 102 can generate a parking event in response to determining that the vehicle is parked. The DPS 102 can establish a timer upon the generation of the parking event. The timer can include a time duration for the client to complete a transaction for parking the vehicle. The timer can be predetermined by the facility operator or administrator of the DPS 102, for example. Upon expiration of the timer, the DPS 102 can generate a violation event. The DPS 102 can establish different timers based on the parking spots, such as unassigned spots (e.g., no signs or symbols indicating parking for certain authorized vehicles), reserved spots, or handicapped spots. For example, the DPS 102 can establish a 10-minutes timer for vehicles parked in an unassigned parking spot, 15-minutes for vehicles parked in a handicapped spot, or 1-minute for vehicles parked in a reserved spot. In another example, the DPS 102 can establish a longer timer for handicapped parking slots and a shorter timer for reserved parking slots. The timer can be configured or updated to any duration by the facility operator or administrator of the DPS 102.

In another example, the DPS 102 can identify the identification number of the vehicle in response to the vehicle parked in the reserved spot. The DPS 102 can determine whether the identification number is included in a list of reserved vehicles, such as vehicles authorized to park in the reserved spots. The reserved list can include or be a part of an exclusion list or exempt list. In this case, the DPS 102 can generate a violation event for the vehicle with an identification number not included in the reserved list. In other cases, the DPS 102 can disable a timer for vehicles authorized to park in the reserved list. If vehicles listed in the reserved list still should complete the transaction, the DPS 102 can establish a timer for the reserved spots.

In further example, the DPS 102 can establish multiple timers for vehicles, such as vehicles parked in handicapped spots. For example, the DPS 102 can establish a first timer to confirm that the vehicle is parked at the spot. In the case of handicapped parking, the DPS 102 can determine whether the vehicle is equipped with a valid handicap or disability plate. In the case that the vehicle is not equipped with a disability plate, the DPS 102 can generate a violation event. Otherwise, if the vehicle is equipped with a disability plate, the DPS 102 can establish a second timer providing a grace period for the client to complete a transaction. In some cases, a valid handicapped vehicle may be eligible for reduced parking fee.

In some cases, the DPS 102 may not establish a timer unless the vehicle is parked. In some other cases, the DPS 102 can establish a timer in response to a predetermined duration since the vehicle enters the facility. For example, the DPS 102 can track the length of time since the vehicle enters the parking facility 302. The DPS 102 can initiate a timer in response to a predetermined duration (e.g., 5 minutes, 10 minutes, etc.) since the vehicle enters. In this case, the DPS 102 can initiate a timer without the vehicle parking in a slot.

In some cases, the DPS 102 can determine that the vehicle moved in and out of the facility without parking or within a predetermined time period (e.g., 5 minutes since entry). In this case, the DPS 102 may deregister the identification number of the vehicle if the identification number is not associated with any violation event. Further, as an example, the DPS 102 may not establish or start a timer, or may not query the identification number for transaction information, as the vehicle is not parked for at least a duration. In some cases, the client of the vehicle may be charged upon entry, wherein the client can complete a transaction within the established timer duration.

Illustration 300 can depict a map displayed on at least the facility device 108 of a facility operator or an enforcement device 124. The map can include various icons overlaid on the map. The DPS 102 can retrieve the icon and apply the overlay on the map. The icons can be stored in the database of the DPS 102 or a remote server. The DPS 102 can apply or assign icons on the map based on generated events, such as parking events, violation events, movement of vehicles, the establishment of timers, among other activities. For example, the map without overlay can include the entrance 308A and the exit 308B of the parking facility 302, and various lines indicating the parking slots. The map can be preconfigured or pre-generated by the facility operator. In some cases, the DPS 102 can execute at least one of the image processing techniques to generate a map of the parking facility 302 using data from the cameras 304. The overlay on the map can include one or more vehicles parked in various slots.

The overlay can include vehicles traversing through the facility (not shown). The overlay can include camera locations. The overlay can include a timer established for individual vehicles. For example, the DPS 102 can establish timers 312A-B to the vehicles in response to generating a parking event for the respective vehicles. In this case, timer 312A can indicate the remaining 3 minutes and 20 seconds, and timer 312B can indicate the remaining 8 minutes and 30 seconds of time. The timer can represent a grace period until the DPS 102 queries the transaction processing system 128 for transaction solution or transaction information. The DPS 102 can overlay the timer on each slot associated with the vehicle. The DPS 102 can move the overlay for each vehicle upon transitioning to a different parking slot. In some cases, the DPS 102 can keep track of the events associated with the vehicle even when moving to a different facility configured with devices in communication with the DPS 102. The overlay can include an indication of a completed transaction for certain vehicles. The overlay can include an indication of the expiration of the timer, which can indicate that the established timer has expired without a completed transaction.

The DPS 102 can update the icons in response to any new events or updates to the events. For example, subsequent to the expiration of the timer without a completed transaction, but prior to an enforcement officer marking the vehicle, the DPS 102 can receive transaction information associated with the vehicle assigned with the expired timer icon. In this case, the transaction information indicating a completed transaction. In this case, the DPS 102 can update the icon to a completed transaction icon for the vehicle or the parking slot occupied by the vehicle. The DPS 102 can receive the transaction information in response to a client transmitting the transaction information to the transaction processing system 128 with the identification number of the vehicle. In some cases, the DPS 102 can query the transaction information at a predetermined time period (e.g., 1 minute, 5 minutes, 10 minutes, etc.). The DPS 102 may query the transaction processing system 128 at the predetermined time period with identification numbers of vehicles with an expired timer. The DPS 102 can update the positions and appearances of the icons, remove the icons, or add icons in the overlay per the configuration of the facility operator. In some cases, the enforcement officer can provide feedback or adjustment to the icons.

The icons can be interactive elements displayed on the display device of the enforcement device 124. The user can interact with the icons to display additional information on at least the event or data associated with the respective icon. For example, in response to an interaction with the vehicle icon, the DPS 102 can transmit parking event information or other vehicular information associated with the vehicle to the enforcement device 124. In another example, in response to an interaction with an icon representing a violation event, such as the expired timer icon, the DPS 102 can transmit the violation event information associated with the icon to display on the enforcement device 124. In some cases, in response to an interaction with one of the icons representing the cameras 304, the DPS 102 can forward live-feed of the respective camera 304 to the enforcement device 124. The facility device 108 can perform one or more similar features as the enforcement device 124 for displaying or interacting with the icons.

The DPS 102 can provide a route as an overlay on the map, such as routes 316A-C. The route can appear similar to any navigation tool or navigation icon. The DPS 102 can overlay the route on the map of the parking facility 302. The route can guide an enforcement officer at least from the entrance 308A to one of the parking spots. Further, the route can guide the enforcement officer from the parking spot to another parking or subsequent parking spot based on at least the location or the rank of the violation event. In some cases, the route can guide the enforcement officer to the exit 308B. In some cases, the route can guide the enforcement officer to a second facility for enforcing parking violations.

Using the generated route displayed on the map, the enforcement officer can navigate to different parking slot locations to mark the vehicles. The DPS 102 can overlay a mark icon (not shown) on a respective vehicle or parking spot marked by the enforcement officer. The DPS 102 can overlay the mark icon in response to an enforcement device transmitting an indication of marking a vehicle via the enforcement device 124 to the DPS 102. Accordingly, the DPS 102 can update the overlay of the map with the mark icon on the parking spot of the vehicle.

For example, the DPS 102 can provide routes 316A-C on a map of the parking facility 302 to indicate the route an enforcement officer should take to efficiently mark vehicles. In this example, the enforcement officer can navigate from the entrance 308A to a first vehicle, following 316A route. Upon marking the first vehicle, the enforcement officer can follow the 316B route to reach the second vehicle. After marking the second vehicle, since there is no violation event associated with other vehicles in the parking facility 302, the enforcement officer can follow the 316C route to exit the facility. In some cases, the route can be navigated to the second vehicle prior to the first vehicle based on the rank of the violation event.

In some cases, the DPS 102 can determine that at least one of the timers will expire during or shortly after (e.g., 10 seconds, 20 seconds, 1 minute, etc.) marking of the vehicles inside the facility. In this case, the DPS 102 can generate a route accounting for at least the time for the enforcement officer to i) travel to individual vehicles, ii) marking the vehicles, and iii) check for the next destination. Therefore, the initial route can include at least one vehicle with a running timer within the path. By the time the enforcement officer reaches the vehicle that initially has the timer, the timer may be expired or near expiration (e.g., 1 second, 2 seconds, 5 seconds, 10 seconds, 15 seconds, etc.). Accordingly, the DPS 102 can generate and provide one or more routes to the enforcement device 124 to increase the efficiencies for marking vehicles and the reliability and accuracy of the vehicle location and event information.

Figure 4:
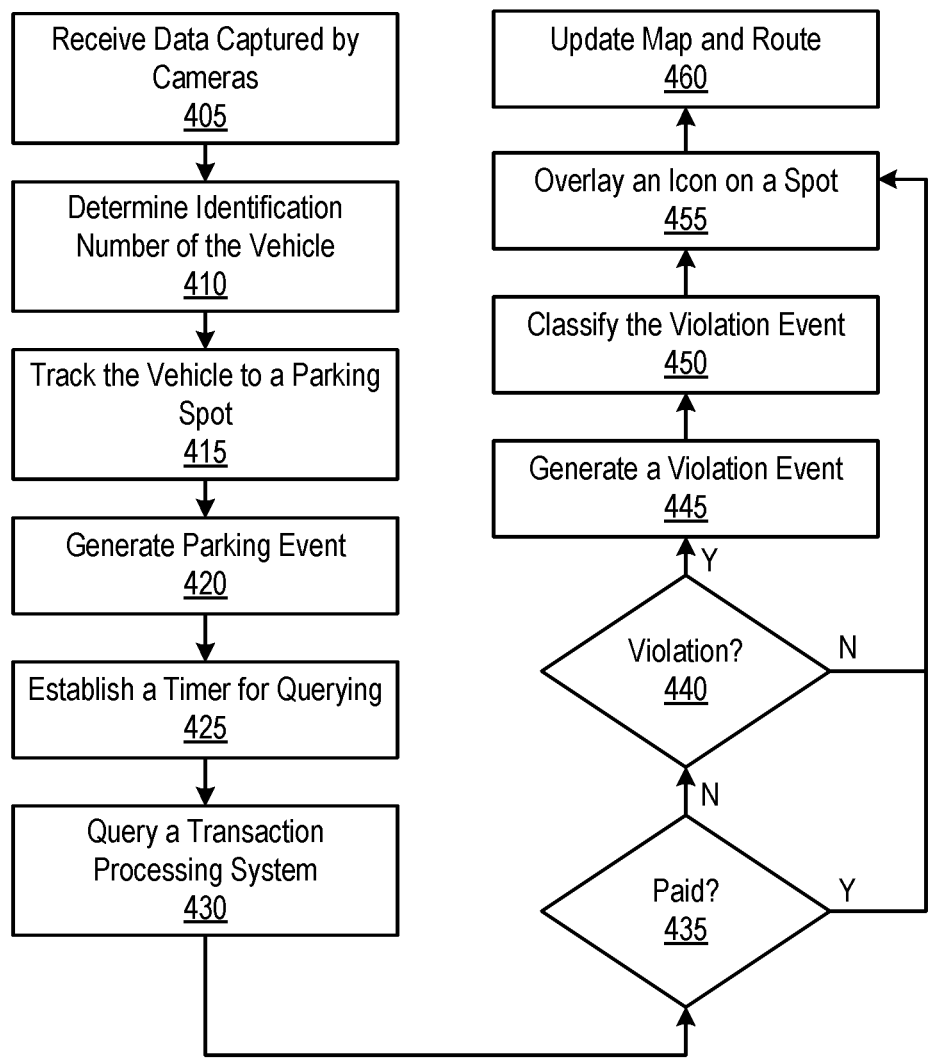
FIG. 4 is a flow diagram of an example method of real-time vehicular parking enforcement, in accordance with an implementation.

FIG. 4 is a flow diagram of an example method of real-time vehicular parking enforcement, in accordance with an implementation. The method 400 can be performed by one or more components (e.g., DPS 102, facility device 108, camera 112, activation device 116, client device 120, enforcement device 124, or transaction processing system 128) of system 100, one or more components of diagram 200, or one or more components thereof. In brief overview, at step 405, a DPS can receive data captured by one or more cameras. At step 410, the DPS can determine an identification number of a vehicle. At step 415, the DPS can track the vehicle to a parking spot. At step 420, the DPS can generate a parking event. At step 425, the DPS can establish a timer for querying a transaction processing system. At step 430, the DPS can query a transaction processing system. At step 435, the DPS can determine whether the transaction has been completed. At step 440, the DPS can determine whether the vehicle incurred a violation. At step 445, the DPS can generate a violation event. At step 450, the DPS can classify the violation event. At step 455, the DPS can overlay an icon on a parking spot. At step 460, the DPS can update the map and the route on the map.

Still referring to FIG. 4, and in further detail, the DPS can receive data captured by the cameras via a network, at step 405. The DPS can receive the captured data directly from the one or more cameras or from an intermediary device electrically connected to the cameras. The cameras can be positioned to monitor various locations within a parking facility (sometimes referred to generally as a facility). The facility can be an indoor facility, such as a parking garage, or an outdoor facility, such as a parking lot. For example, the cameras can include at least one camera positioned to capture the access point of the facility. The cameras can include one or more cameras to capture the parking spots, paths from the access point to the parking spots, or other locations within the facility.

The DPS can detect entry of a vehicle into the facility via the access point based on the data captured by the one or more cameras. For example, the DPS can detect entry of the vehicle based on the direction of travel of the vehicle through the access point. The DPS can determine the direction of travel by using an image processing technique or a video analytics feature. The DPS can determine that the vehicle is entering into the facility based on the direction of travel indicating that the vehicle is moving from outside the facility to inside the facility, such as into the premise of the facility. Similarly, the DPS can detect exits of a vehicle from the facility. The DPS can detect that the vehicle is exiting the facility based on the direction of travel of the vehicle, such as the vehicle moving out of the facility through the access point. In some cases, the DPS can detect vehicles entering or exiting the facility through other access points if the facility has multiple access points.

At step 410, the DPS can determine an identification number of a vehicle. For example, the DPS can perform an object detection or an image processing technique in response to detecting entry of a vehicle into the facility. The DPS can detect or identify the license plate of the vehicle using the image processing technique. The DPS can determine an identification number of the vehicle via the application of the image processing technique on captured data from at least one camera. For example, the DPS can use an automatic license plate reader technique or an AI-based processing technique to determine the identification number of the vehicle. The DPS can link the vehicle with the identification number to associate any activities or events performed by the vehicle to the identification number. The DPS can retrieve or update events or information corresponding to the vehicle using the identification number.

At step 415, the DPS can track the vehicle to a parking spot via the one or more cameras. For example, the DPS can perform video analytics on captured data from the one or more cameras. The cameras can provide overlapping fields of view throughout the facility. The DPS can match timestamps of data from different cameras throughout the facility to determine the movement of the vehicle within the facility and the location of the vehicle. Based on the captured cameras from the one or more cameras, the DPS can track the vehicle in the facility, such as the vehicle moving from the access point to one of various parking spots. The DPS can track the vehicle traversing to a different parking spot, such as moving from a first parking spot to a second parking spot. Further, the DPS can track the vehicle leaving a parking spot and exiting the facility. For example, the DPS can stop tracking the vehicle when the vehicle leaves the facility.

At step 420, the DPS can generate a parking event for the vehicle. The DPS can generate the parking event in response to the vehicle occupying or parking at a parking spot. The DPS can determine whether the vehicle is parked, either in a parking spot or other spots within the facility via any indication of a parked vehicle. For example, the DPS can determine that the vehicle is parked upon determining that the vehicle has been idled or not moved for a predetermined period of time indicating a parked vehicle. In another example, the DPS can determine that the vehicle is parked based on the vehicle located in a parking spot. In yet another example, the DPS can determine that the vehicle is parked based on a client or the driver of the vehicle leaving the vehicle. The DPS can generate a parking event including at least an image of the vehicle, an identification number of the vehicle, and a timestamp corresponding to the occupation of the first parking spot. In some cases, the parking event can include other information associated with the vehicle before and during occupancy at the parking spot, such as a type of the vehicle (e.g., sedan, hatchback, sport utility vehicle ("SUV"), etc.).

At step 425, the DPS can establish a timer for querying a transaction processing system. The DPS can establish the timer based on at least one of the timestamp of when the vehicle enters the facility or the timestamp corresponding to when the vehicle is parked. The timer can include or be a countdown timer providing a grace period for the client of the vehicle to complete a transaction, for example. The timer can be preconfigured by the facility operator or the administrator of the DPS. The DPS can establish different timers based on different types of parking spots. In some cases, the DPS can establish different times based on the location of the parking spot. For example, the farther the parking spot from an activation device or a client device (e.g., kiosk), the more time for the timer. An example of the duration of the timer can be 5 minutes, 10 minutes, 15 minutes, etc. The DPS can establish a timer for other vehicles based on a similar process.

In some cases, the DPS may not establish or can disable a timer for certain vehicles. For example, the DPS can detect entry of a second vehicle via data captured by the one or more cameras. The DPS can determine the identification number of the second vehicle based on the captured data. The DPS can compare the identification number of the second vehicle to a list of exempt vehicles. The list of exempt vehicles can include various identification numbers stored or maintained in the database of the DPS or a remote server storing data for the DPS. The list of exempt vehicles can list identification numbers that have already completed transactions or is exempt from transaction processing. For example, the list can include vehicles registered with a monthly, yearly, or seasonal pass for parking in the facility. In some cases, the list can include vehicles with the privilege to park in the facility without having to provide transaction information, such as facility operators or enforcement officers. The DPS can determine that the second vehicle is exempt from the transaction based on the identification number of the second vehicle included in the list. Accordingly, the DPS can disable the timer for vehicles in response to determining that the second vehicle is exempt from the transaction processing based on being listed in the exempt list.

In some cases, based on the day of the week or the time of the day, the DPS can be configured to disable the timer for vehicles entering the facility. For example, based on a configuration of the facility operator, the DPS can be configured to disable the timer for Sunday between 3:00 PM and 9:00 PM. In this case, the DPS may not establish a timer for vehicles entering between the indicated time on a Sunday. However, based on the policies of the facility, the DPS may detect vehicles past the exempt time period of 3:00 PM and 9:00 PM, such as detecting vehicles in the facility after 9:00 PM. In this case, as an example, the DPS can start the timer or responsively generate a violation event unless the identification number of the vehicle is included in the exemption list or if the client pre-completed the transaction.

At step 430, the DPS can query a transaction processing system for transaction information associated with the identification number of the vehicle. The DPS can query the transaction processing system via an API configured to provide a communication channel between devices, applications, or platforms. The DPS can query the transaction processing system in response to the expiration of the established timer. For example, the DPS can determine that the timer established upon the vehicle parked in the parking spot has expired. The expiration of the timer can signify that the client, not exempt from transaction processing, should have completed the transaction. The DPS can query the transaction processing system using the identification number of the vehicle to determine the status of the transaction. In this case, the parking facility can operate on a pay-to-access basis.

In some cases, the DPS can query the transaction processing system in response to the vehicle exiting the facility. In this case, the DPS can identify the transaction amount due based on at least the duration of the vehicle staying within the facility. The DPS can query the transaction processing system in response to the vehicle exiting the facility. In this case, the DPS can request the client to complete the transaction via an application of the parking facility installed on the client device (e.g., mobile device) or via an email linked to the identification number upon signing up with the application. In some cases, the transaction processing system can transmit the transaction information to the DPS in response to the client initiating any transaction.

In response to querying the transaction processing system, the DPS can receive transaction information associated with the identification numbers of the respective vehicles. The transaction information can be provided for clients that completed a transaction for the vehicle or if the client provided at least a portion of the transaction amount. An absence of transaction information for certain identification numbers can indicate that no transaction has been received from the client or with respect to the vehicle. In some cases, the transaction processing system can provide a list of all identification numbers queried by the DPS and the associated transaction information of the listed identification numbers.

At step 435, the DPS can determine whether the transaction has been completed. For example, the DPS can determine the transaction amount due for the vehicle. The transaction amount due can be based on at least one of the entry timestamps, parking timestamps, or other parking event information. The DPS can receive the transaction information from the transaction processing system indicating the transaction amount provided by the client of a respective vehicle identified by the identification number of the vehicle. The DPS can compare the transaction amount due to the transaction amount provided by the client. Accordingly, the DPS can determine whether the transaction is sufficient for the vehicle. For example, the DPS can determine an insufficient transaction if the transaction amount due exceeds the transaction amount provided (e.g., paid amount). In another example, the DPS can determine a completed or sufficient transaction based on the transaction amount provided is greater than or equal to the transaction amount due. The DPS can proceed to step 455 upon a completed transaction and to step 440 upon an insufficient or incomplete transaction. In some cases, the DPS can still proceed to step 440 to determine other potential violations.

At step 440, the DPS can determine whether the vehicle incurred a violation. For example, the DPS can determine that the vehicle incurred a violation based on an incomplete transaction upon the expiration of the established timer. In this case, the DPS can determine that the client of the vehicle has not provided sufficient transaction in a timely manner, thereby being assigned a violation, as part of the violation reason. The DPS can determine that the vehicle incurred a violation based on the vehicle parking at a non-designated parking slot. For example, the DPS can determine that the vehicle should be assigned a violation event based on the vehicle parking next to a fire hydrant, in a restricted zone, in a reserved spot where the identification number of the vehicle does not match the reservation list, in a handicapped spot where the vehicle does not have a handicapped plate, etc. The violations can be based on the policy configured by the facility operator.

In some cases, the DPS can determine that the vehicle is in violation of a policy based on an expiration of a parking timer. For example, the parking facility can include or be installed with parking meters or a centralized parking meter. The parking timer can refer to a countdown timer that can be increased by completing a transaction. The DPS can increase the parking timer based on the transaction amount provided. The DPS can determine whether the parking timer has expired. Upon expiration, the DPS can determine that the vehicle should be assigned a violation or incurred a violation. The DPS can proceed to step 445 upon determining that the vehicle incurred a violation. The DPS can proceed to step 455 upon determining that the vehicle did not incur at least one of the violations.

At step 445, the DPS can generate a violation event for the vehicle. The DPS can generate the violation event based on the transaction information received from the transaction processing system. For example, the DPS can determine that the transaction is incomplete or insufficient for a respective vehicle. The DPS can generate the violation event for the vehicle in response to querying the transaction processing system and generating the parking event. The DPS can generate the violation event for other types of violations, which can be classified as in step 450. The violation event can include at least some of the information from the parking event. For example, the violation event can include the identification number of the vehicle, the image of the vehicle, the reason for the violation, the timestamp of parking, the timestamp of the violation, among other information associated with the activities of the vehicle.

At step 450, the DPS can classify the violation event. The DPS can classify the violation event based on at least one of the timestamp when the vehicle enters the parking facility, the parking event, or the transaction information. For example, the DPS can classify the violation event as an incomplete transaction based on the time of entry or parking and the transaction information from the transaction processing system. In this example, the DPS can classify the violation event based on a duration of ticket expiration or an absence of transaction information associated with the identification number of the vehicle.

In another example, the DPS can classify the violation event as an excess in parking duration, where the vehicle may exceed the parking time limit as part of the policy of the facility. The parking time limit can include, for example, 30 minutes, 1 hour, 2 hours, etc. In yet another example, the DPS can classify the violation event as a prohibited parking location, such as when the vehicle is parked in a restricted area or spots dedicated for certain other vehicles (e.g., reserved, handicapped, or employees). The DPS can classify the violation event in any other groupings as configurable by the administrator of the DPS.

The DPS can assign the generated violation events to the vehicles parked in a subset of the parking spots. In some cases, the DPS can assign the generated violation events to the subset of parking spots associated with the vehicles. The DPS can classify the violation events assigned to various vehicles or parking spots. The classified violation events can be represented with icons or graphical content. The DPS can assign different icons based on the type of violation events, such that the enforcement officer or facility operator can identify the type of events based on the icons.

The DPS can assign a rank to the violation event. The rank can represent the severity or importance of the violation events to be marked by the enforcement officer. The DPS can rank the various parking spots based on the classification of the violation events assigned to the vehicles. For example, the DPS can rank types of classifications of violation events differently. The DPS can rank the classification of a ticket expiration violation as a low rank (e.g., 1/5, among other metrics). The DPS can increase the rank of the violation event based on the duration since the ticket expired. The DPS can rank a restricted area parking violation as a medium rank (e.g., 3/5). The DPS can rank the obstruction of the traffic violation as a high rank (e.g., 5/5), such as by parking to block the access point or along the path to various parking spots. The DPS can increase the rank of the violation based on the duration since the violation event has been generated.

The DPS can generate a route for navigating to various parking spots with violations. The DPS can generate the route for overlaying on a map for display on the enforcement device. The DPS can generate the route based on at least one of the ranks assigned to the parking spots or the location of the parking spots assigned with violation events. The DPS can use any path calculation algorithm to determine the route. The DPS can generate the route for at least one enforcement officer to traverse the parking facility to mark or provide a parking ticket to the vehicle. The DPS can provide the route as an overlay on the digital map to display on the enforcement device. The DPS can receive an indication of one or more parking spots marked by the enforcement officer. The DPS can receive the indication from the enforcement device. The DPS can identify an icon associated with a spot being marked to overlay on the map.

At step 455, the DPS can overlay an icon on a parking spot on a digital map. The digital map can include various parking spots within the facility. The digital map can include one or more vehicles within the facility. The vehicle can be included in the digital map as an icon or graphical content. For example, the DPS can overlay an icon representing the vehicle on the map. The DPS can overlay an icon on one or more parking spots representing one or more events associated with the vehicle occupying the respective parking spot. In some cases, the DPS can overlay an icon on the vehicle, where the icon can be linked to the vehicle to any parking spot. The DPS can overlay an icon indicating a classification of a violation event assigned to the vehicle or the parking spot occupied by the vehicle. The DPS can overlay other icons, such as icons representing a parking event, the established timer, transaction status (e.g., completed or incompleted), cameras, or different types of classification of violation events.

The DPS can provide the digital map for display on a remote computing device, such as an enforcement device. The digital map can be overlaid with the various icons indicating at least the classification of the violation events assigned to the vehicles occupying the parking slots. The DPS can provide the digital map to other authorized devices, such as the facility device for facility operators. The DPS can provide information stored in the parking event for display on the remote computing device. The DPS can provide parking event information upon request from the remote computing device. For example, the DPS can receive an indication of interaction with one of the vehicles or icons associated with the vehicles. The DPS can identify the parking event information (or other information associated with the vehicle). Accordingly, the DPS can provide the parking event information to the remote computing device in response to receiving the request. A similar process can be used for requesting violation event information or camera feed information. The enforcement officer can request information by interacting with the icons displayed on the enforcement device.

At step 460, the DPS can update the map and the route on the map. The DPS can update the digital map of the facility in real-time based on the data streamed from the one or more cameras. For example, the DPS can receive real-time feed from the cameras. The DPS can determine or generate new parking events, violation events, or other activities or movements of the vehicles. In some cases, the DPS can detect the vehicle exiting the facility, thereby removing icons associated with the vehicle. The DPS can maintain event information, such as violation events associated with vehicles accessing the facility for enforcement in future visits or other facilities. The DPS can provide an update or the updated digital map for display on the enforcement device or other remote computing device.

The DPS can receive an indication that the violation event has been marked. The DPS can update the icon associated with the violation event to a different icon indicating that the violation event is marked. The DPS can receive an indication that the violation event has been marked from the enforcement device. Upon updating the icon, the DPS can provide an updated map to the enforcement device. By marking the violation event, the DPS can update the route overlaid on the digital map, such that the route may not revisit the marked parking spot. In some cases, if the DPS generated an additional violation event for the marked vehicle, the DPS may update the marked icon with the additional violation event. In some cases, the marked icon can overrule other violation event icons. In some cases, the DPS can overlay multiple icons in each parking spot based on the number of violation events associated with the vehicle. The number of icons overlaid in a spot can indicate the severity or rank of the violation event.

In some cases, the DPS can determine, based on the data captured by the cameras, that a vehicle with an icon exited or leave a parking spot. In this case, the DPS can remove the icon from the parking spot in response to the vehicle exiting the parking spot. In some cases, the DPS can move the icon with the movement of the vehicle. The DPS may add the icon back in the digital map on a second parking spot if the vehicle transition to the second parking spot. For example, the icon can indicate a violation event. The DPS can remove the icon indicating the violation event of the vehicle, which may be marked, in response to the vehicle exiting the parking spot.

Figure 5:
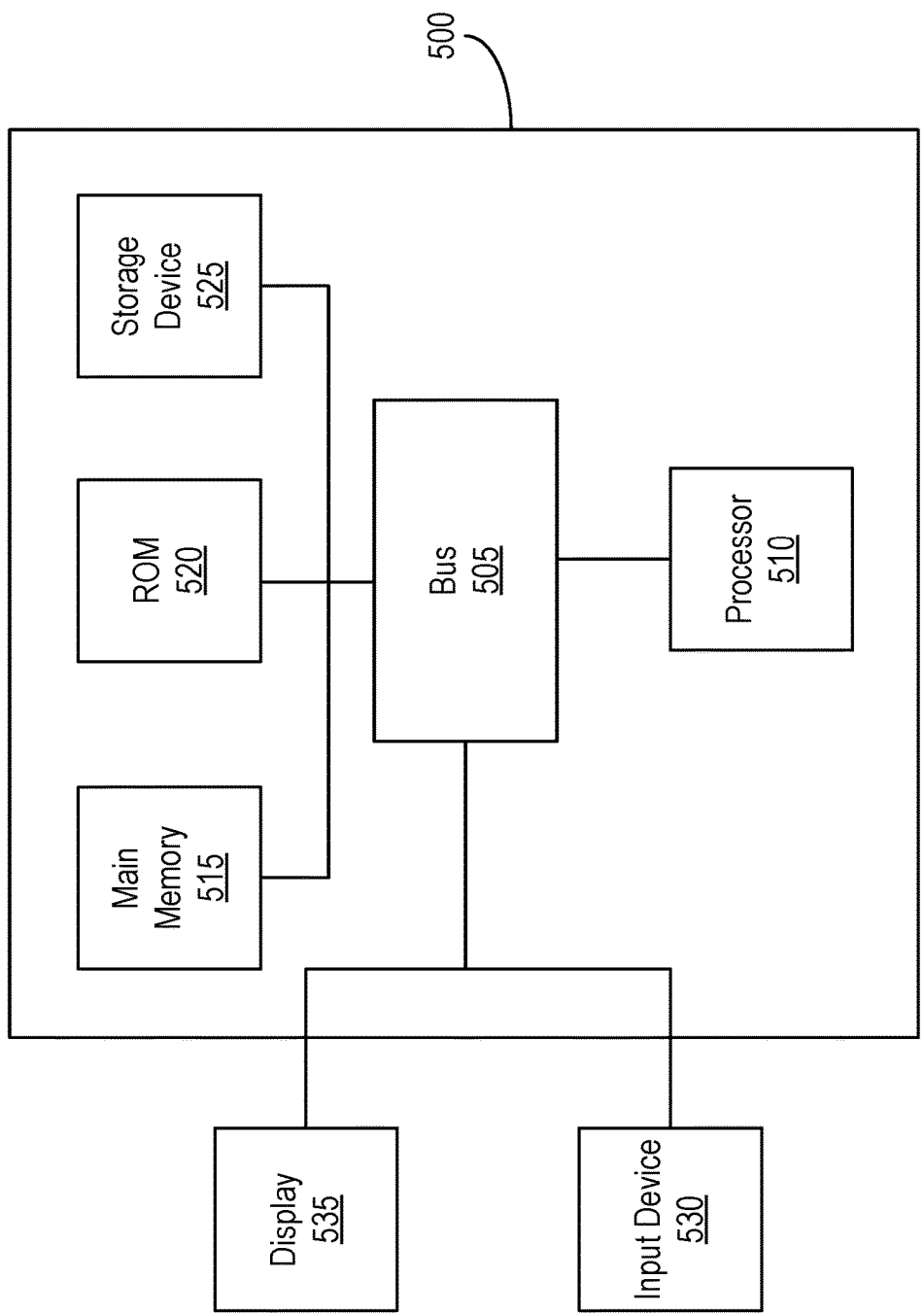
FIG. 5 is a block diagram illustrating an architecture for a computer system that can be employed to implement elements of the systems, methods and apparatus described and illustrated herein, including, for example, the systems and apparatus depicted in FIGS. 1-3, and the method depicted in FIG. 4.

FIG. 5 is a block diagram of an example computer system 500. The computer system or computing device 500 can include or be used to implement one or more component of system 100, diagram 200, or perform one or more aspect of the method 400. For example, the system 500 can implement one or more component or functionality of the DPS 102, the facility device 108, the camera 112, the activation device 116, the client device 120, the enforcement device 124, or the transaction processing system 128. The computing system 500 includes at least one bus 505 or other communication component for communicating information and at least one processor 510 or processing circuit coupled to the bus 505 for processing information. The computing system 500 can also include one or more processors 510 or processing circuits coupled to the bus for processing information. The computing system 500 also includes at least one main memory 515, such as a random access memory (RAM) or other dynamic storage device, coupled to the bus 505 for storing information, and instructions to be executed by the processor 510. The computing system 500 may include at least one read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions. The storage device 525 can include or be part of the database 156.

The computing system 500 may be coupled via the bus 505 to a display 535, such as a liquid crystal display, or active matrix display, for displaying information to a user of the facility device 108, the client device 120, or the enforcement device 124. An input device 530, such as a keyboard or voice interface may be coupled to the bus 505 for communicating information and commands to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 (e.g., on a vehicle dashboard) can, for example, be part of the facility device 108, the client device 120, the enforcement device 124, or other components depicted herein.

The processes, systems, and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components, such as components of the DPS 102, which illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A system for real-time vehicular parking enforcement, comprising:
    a data processing system comprising one or more processors and memory to:
    receive, via a network, data captured by one or more cameras, the one or more cameras positioned to monitor an access point of a parking facility and a plurality of parking spots within the parking facility;
    detect, based on the data captured by the one or more cameras, entry of a vehicle into the parking facility via the access point and a time stamp at which the vehicle enters the parking facility;
    determine, responsive to detection of the entry of the vehicle, an identification number for the vehicle via application of an image processing technique on the data captured by the one or more cameras;
    track, via the one or more cameras, the vehicle from the access point to a first parking spot of the plurality of parking spots;
    generate, responsive to the vehicle occupying the first parking spot, a parking event for the vehicle comprising an image of the vehicle, the identification number of the vehicle, and a time stamp corresponding to occupation of the first parking spot;
    establish, based on at least one of the time stamp at which the vehicle enters the parking facility and the time stamp corresponding to occupation of the first parking spot, a timer for querying a transaction processing system;
    query, via an application programming interface responsive to expiration of the timer, the transaction processing system for transaction information associated with the identification number of the vehicle;
    generate, based on the transaction information received responsive to the query and the parking event, a violation event for the vehicle;
    classify the violation event based on at least one of the time stamp at which the vehicle enters the parking facility, the parking event, or the transaction information;
    overlay, on a digital map of the parking facility comprising the plurality of parking spots, an icon on the first parking spot that indicates the classification of the violation event;
    provide the digital map overlaid with the icon for display on a computing device remote from the data processing system;
    receive, from the computing device, an indication that the violation event has been marked; and
    update the icon overlaid on the digital map to indicate that the violation event at the first parking spot has been marked.

2. The system of claim 1, wherein the data processing system is further configured to:
    classify the violation event based on a duration of ticket expiration or an absence of transaction information.

3. The system of claim 1, wherein the data processing system is further configured to:
 update the digital map of the parking facility in real-time based on the data streamed from the one or more cameras.

4. The system of claim 3, wherein the data processing system is further configured to:
 provide, responsive to a request from the computing device, information stored in the parking event for display via the computing device.

5. The system of claim 1, wherein the data processing system is further configured to:
 determine, based on the data received from the one or more cameras subsequent to the indication that the violation event has been marked, the vehicle having the identification has exited the first parking spot; and
 remove, responsive to the vehicle exiting the first parking spot, the icon indicating the violation event at the first parking spot.

6. The system of claim 1, wherein the data processing system is further configured to:
 detect the entry of the vehicle into the parking facility via the access point based on a direction of travel of the vehicle through the access point.

7. The system of claim 1, wherein the data processing system is further configured to:
 detect, via the data captured by the one or more cameras, entry of a second vehicle into the parking facility;
 determine, based on the data captured by the one or more cameras, a second identification of the second vehicle;
 determine, based on a lookup in a data repository, that the second vehicle is exempt from transaction processing; and
 disable a timer for the second vehicle responsive to the determination that the second vehicle is exempt from transaction processing.

8. The system of claim 1, wherein the data processing system is further configured to:
 assign, based on the data captured by the one or more cameras, violation events to a plurality of vehicles parked in a subset of the plurality of parking spots;
 classify the violation events assigned to the plurality of vehicles in the subset of the plurality of parking spots; and
 provide, for display on the computing device, the digital map overlaid with a plurality of icons indicating the classification of the violation events assigned to the plurality of vehicles in the subset of the plurality of parking spots.

9. The system of claim 8, wherein the data processing system is further configured to:
 rank the subset of the plurality of parking spots based on the classification of the violation events assigned to the plurality of vehicles;
 generate, based on the rank of the subset of the plurality of parking spots and a location of each the subset of the plurality of parking spots in the parking facility, a route to traverse the parking facility to mark the plurality of vehicles; and
 provide, for display on the computing device, the digital map overlaid with the route.

10. A method for real-time vehicular parking enforcement, comprising:
 receiving, by a data processing system comprising one or more processors and memory, via a network, data captured by one or more cameras, the one or more cameras positioned to monitor an access point of a parking facility and a plurality of parking spots within the parking facility;
 detecting, by the data processing system, based on the data captured by the one or more cameras, entry of a vehicle into the parking facility via the access point and a time stamp at which the vehicle enters the parking facility;
 determining, by the data processing system, responsive to detection of the entry of the vehicle, an identification number for the vehicle via application of an image processing technique on the data captured by the one or more cameras;
 tracking, by the data processing system, via the one or more cameras, the vehicle from the access point to a first parking spot of the plurality of parking spots;
 generating, by the data processing system, responsive to the vehicle occupying the first parking spot, a parking event for the vehicle comprising an image of the vehicle, the identification number of the vehicle, and a time stamp corresponding to occupation of the first parking spot;
 establishing, by the data processing system, based on at least one of the time stamp at which the vehicle enters the parking facility and the time stamp corresponding to occupation of the first parking spot, a timer for querying a transaction processing system;
 querying, by the data processing system, via an application programming interface responsive to expiration of the timer, the transaction processing system for transaction information associated with the identification number of the vehicle;
 generating, by the data processing system, based on the transaction information received responsive to the query and the parking event, a violation event for the vehicle;
 classifying, by the data processing system, the violation event based on at least one of the time stamp at which the vehicle enters the parking facility, the parking event, or the transaction information;
 overlaying, by the data processing system, on a digital map of the parking facility comprising the plurality of parking spots, an icon on the first parking spot that indicates the classification of the violation event;
 providing, by the data processing system, the digital map for display on a computing device remote from the data processing system;
 receiving, by the data processing system, from the computing device, an indication that the violation event has been marked; and
 updating, by the data processing system, the icon overlaid on the digital map to indicate that the violation event at the first parking spot has been marked.

11. The method of claim 10, further comprising:
 classifying, by the data processing system, the violation event based on a duration of ticket expiration or an absence of transaction information.

12. The method of claim 10, further comprising:
 updating, by the data processing system, the digital map of the parking facility in real-time based on the data streamed from the one or more cameras.

13. The method of claim 12, further comprising:
 providing, by the data processing system, responsive to a request from the computing device, information stored in the parking event for display via the computing device.

14. The method of claim 10, further comprising:
- determining, by the data processing system, based on the data received from the one or more cameras subsequent to the indication that the violation event has been marked, the vehicle having the identification has exited the first parking spot; and
- removing, by the data processing system, responsive to the vehicle exiting the first parking spot, the icon indicating the violation event at the first parking spot.

15. The method of claim 10, further comprising:
- detecting, by the data processing system, the entry of the vehicle into the parking facility via the access point based on a direction of travel of the vehicle through the access point.

16. The method of claim 10, further comprising:
- detecting, by the data processing system, via the data captured by the one or more cameras, entry of a second vehicle into the parking facility;
- determining, by the data processing system, based on the data captured by the one or more cameras, a second identification of the second vehicle;
- determining, by the data processing system, based on a lookup in a data repository, that the second vehicle is exempt from transaction processing; and
- disabling, by the data processing system, a timer for the second vehicle responsive to the determination that the second vehicle is exempt from transaction processing.

17. The method of claim 10, further comprising:
- assigning, by the data processing system, based on the data captured by the one or more cameras, violation events to a plurality of vehicles parked in a subset of the plurality of parking spots;
- classifying, by the data processing system, the violation events assigned to the plurality of vehicles in the subset of the plurality of parking spots; and
- providing, by the data processing system, for display on the computing device, the digital map overlaid with a plurality of icons indicating the classification of the violation events assigned to the plurality of vehicles in the subset of the plurality of parking spots.

18. The method of claim 17, further comprising:
- ranking, by the data processing system, the subset of the plurality of parking spots based on the classification of the violation events assigned to the plurality of vehicles;
- generating, by the data processing system, based on the rank of the subset of the plurality of parking spots and a location of each the subset of the plurality of parking spots in the parking facility, a route to traverse the parking facility to mark the plurality of vehicles; and
- providing, by the data processing system, for display on the computing device, the digital map overlaid with the route.

* * * * *